(12) United States Patent
Jinbo et al.

(10) Patent No.: US 7,106,468 B2
(45) Date of Patent: *Sep. 12, 2006

(54) IMAGE FORMING SYSTEM AND IMAGE FORMING APPARATUS

(75) Inventors: Noriyuki Jinbo, Shizuoka-Ken (JP); Satoshi Kamanuma, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 789 days.

This patent is subject to a terminal disclaimer.

(21) Appl. No.: 09/901,032

(22) Filed: Jul. 10, 2001

(65) Prior Publication Data

US 2002/0054330 A1    May 9, 2002

(30) Foreign Application Priority Data

Jul. 11, 2000   (JP) ............................. 2000-210124

(51) Int. Cl.
*G06F 15/00* (2006.01)
(52) U.S. Cl. .................... 358/1.15; 358/1.14; 395/113; 395/114; 399/70; 399/94
(58) Field of Classification Search ............... 358/1.15; 710/10; 455/426.1
See application file for complete search history.

(56) References Cited

U.S. PATENT DOCUMENTS

| | | | |
|---|---|---|---|
| 4,992,866 A | 2/1991 | Morgan | |
| 6,134,401 A | 10/2000 | Yun et al. | |
| 6,745,253 B1 * | 6/2004 | Struble ....................... | 710/10 |
| 2002/0089694 A1 * | 7/2002 | Idehara ...................... | 358/1.15 |
| 2004/0248569 A1 * | 12/2004 | Kondou et al. .......... | 455/426.1 |

FOREIGN PATENT DOCUMENTS

| | | |
|---|---|---|
| JP | 6-233046 | 8/1994 |
| JP | 8-320635 | 12/1996 |
| JP | 9-98475 | 4/1997 |
| JP | 9-193509 | 7/1997 |
| JP | 10-56522 | 2/1998 |
| JP | 10-322491 | 12/1998 |
| JP | 11-202690 | 7/1999 |
| JP | 11-275286 | 10/1999 |
| JP | 11-327827 | 11/1999 |

* cited by examiner

*Primary Examiner*—Kimberly Williams
*Assistant Examiner*—Satwant Singh
(74) *Attorney, Agent, or Firm*—Buchanan Ingersoll & Rooney PC

(57) ABSTRACT

An image forming system includes an image forming apparatus which can wirelessly transmit information that there is a waiting job and has a plurality of modes concerning power consumption, a portable terminal which can receive the information transmitted from the image forming apparatus, a position detector which detects a position of the portable terminal, and a mode switcher which switches from one mode concerning power consumption of the image forming apparatus to another in accordance with the position of the portable terminal which received the information. The position detector detects the distance between a user carrying the portable terminal and the image forming apparatus. Based on the distance data at the time when the portable terminal received the information that there is a document waiting for being outputted by the image forming apparatus, the mode concerning power consumption of the image forming apparatus is switched by the mode switcher.

32 Claims, 21 Drawing Sheets

IMAGE FORMING SYSTEM AND IMAGE FORMING APPARATUS

This application claims priority to Japanese Patent Application No. 2000-210124 filed on Jul. 11, 2000, the disclosure of which is incorporated by reference in its entirety.

BACKGROUND OF THE INVENTION

1. Field of the Invention

The present invention relates to an image forming system and an image forming apparatus.

2. Description of Related Art

In image forming apparatuses such as copying machines and printers connected to a network, it is known to provide a power-saving mode for saving power at the time of waiting a job. In the power-saving mode, for example, a fixing device is kept low in temperature.

However, even if the power-saving mode is switched to a normal operation mode by releasing the power-saving mode, the user have to wait for some time because the image output operation will start only after the temperature of the fixing roller in the fixing device has risen to a predetermined value.

Japanese Patent Laid-open Publication No. H8-320635 discloses an image forming apparatus with a power-saving mode. The image forming apparatus is provided with a human body detection sensor. In this image forming apparatus, when the sensor detects that a human body is located near the image forming apparatus, a power is supplied to the control portion and the driving portion. On the other hand, when the sensor does not detect a human body, the power source other than that of the human body sensor is turned off.

However, according to the aforementioned known structure in which a human body sensor is used to detect an existence of a human body near the image forming apparatus and it is judged whether or not the power-saving mode is to be released based on the detected results by the human body sensor, there is a possibility of misjudging that a user is located near the image forming apparatus even if another person other than the user passes near the image forming apparatus, resulting in ineffective power-saving effect. Furthermore, even if the user returns to the image forming apparatus and the human body sensor detects the user, an image output operation such as a copying operation will not start immediately. Thus, it is required to take some time until the fixing device returns to its operable temperature or the like.

SUMMARY OF THE INVENTION

It is an object of the present invention to provide an image forming system and an image forming apparatus which are excellent in power-saving effect.

It is another object of the present invention to provide an image forming system and an image forming apparatus that can output an image in a necessary and minimum waiting time.

According to a first aspect of the present invention, an image forming system includes an image forming apparatus which has a plurality of modes concerning power consumption and can wirelessly transmit information that there is a waiting job, a portable terminal which can receive the information wirelessly transmitted from the image forming apparatus, a position detector which detects a position of the portable terminal, and a mode switcher which switches from one mode concerning power consumption of the image forming apparatus to another in accordance with the position of the portable terminal which received the information.

With this image forming system, when data is sent to the image forming apparatus via a network or the like, the image forming apparatus wirelessly transmits the information that there is an output-waiting job to a corresponding portable terminal. The position of the portable terminal which received the information that there is an output-waiting job is detected by the position detector. Depending on the detected position, the mode switcher switches from one mode concerning power consumption of the image forming apparatus to another.

Thus, for example, by immediately switching the power-saving mode to a normal mode or the like or switching the power-saving mode towards a normal mode gradually in accordance with the current position of the user who carries the portable terminal which received the information that there is an output-waiting job and is moving towards the image forming apparatus, optimal power-saving effect can be obtained. Furthermore, when the user arrives at the image forming apparatus, the image forming apparatus is ready or almost ready for operation, resulting in a shortened waiting time.

According to a second aspect of the present invention, an image forming apparatus includes a transmitter which can wirelessly transmit job-existence-information that there is an output-waiting job to a portable terminal, a receiver which receives reply-information replying to the job-existence-information wirelessly transmitted from the portable terminal, a position detector which detects a position of the portable terminal whose reply-information is received by the receiver and a mode switcher which switches from one mode concerning power consumption to another based on the position of the portable terminal detected by the position detector.

With this image forming apparatus, for example, by immediately switching a power-saving mode to a normal mode or the like or switching a power-saving mode towards a normal mode gradually in accordance with the current position of the user carrying the portable terminal which received the information that there is an output-waiting job, optimal power-saving effect can be obtained. Furthermore, when the user arrives at the image forming apparatus, the image forming apparatus is ready or almost ready for operation, resulting in a shortened waiting time.

According to a third aspect of the present invention, an image forming apparatus includes a printer which prints a print job on a paper, a communication device which wirelessly communicates with a prescribed portable terminal when there is a print job waiting for being printed by the printer, a position detector which detects a position of the portable terminal based on a communication result of the communication device and a mode selector which selects one mode from a plurality of modes concerning power consumption of the printer based on the position of the portable terminal detected by the position detector.

With this image forming apparatus, for example, by selecting one mode from a plurality of modes such as a power-saving mode and a normal mode in accordance with the current position of the user carrying the portable terminal which received the information that there is a print job, efficient power-saving effect can be obtained. Furthermore, when the user arrives at the image forming apparatus, the image forming apparatus is ready or almost ready for operation, resulting in a shortened waiting time.

According to a fourth aspect of the present invention, an image forming apparatus includes a job-output device which outputs a job, a communication device which wirelessly communicates with a prescribed portable terminal when there is an output-waiting job waiting for being outputted from the job-output device, a position detector which detects a position of the portable terminal based on a communication result of the communication device and a controller which controls the image forming apparatus based on the position of the portable terminal detected by the position detector.

With this image forming apparatus, for example, by controlling the image forming apparatus in accordance with the current position of the user carrying the portable terminal which received the information that there is an output-waiting job, efficient power-saving effect can be obtained. Furthermore, when the user arrives at the image forming apparatus, the image forming apparatus is ready or almost ready for operation, resulting in a shortened waiting time.

According to a fifth aspect of the present invention, an image forming apparatus includes a printing device which prints a print job on a paper, a communication device which wirelessly communicates with a prescribed portable terminal when there is a print job waiting for being printed by the printer, a position detecting device which detects a position of the portable terminal based on a communication result of the communication device and a controller which selects one mode from a plurality of modes concerning power consumption of the printing device based on the position of the portable terminal detected by the position detecting device.

With this image forming apparatus, for example, by selecting one mode from a plurality of modes such as a power-saving mode and a normal mode in accordance with the current position of the user carrying the portable terminal which received the information that there is a print job, efficient power-saving effect can be obtained. Furthermore, when the user arrives at the image forming apparatus, the image forming apparatus is ready or almost ready for operation, resulting in a shortened waiting time.

According to a sixth aspect of the present invention, an image forming apparatus includes an output device which outputs a job, a communication device which wirelessly communicates with a prescribed portable terminal when there is an output-waiting job waiting for being outputted from the output device, a position detection device which detects a position of the portable terminal based on a communication result of the communication device and a controller which controls the image forming apparatus based on the position of the portable terminal detected by the position detection device.

With this image forming apparatus, for example, by controlling the image forming apparatus in accordance with the current position of the user carrying the portable terminal which received the information that there is an output-waiting-job, optimal power-saving effect can be obtained. Furthermore, when the user arrives at the image forming apparatus, the image forming apparatus is ready or almost ready for operation, resulting in a shortened waiting time.

Other objects and the features will be apparent from the following detailed description of the present invention with reference to the attached drawings.

BRIEF DESCRIPTION OF THE DRAWINGS

The present invention will be more fully described and better understood from the following description, taken with the appended drawings, in which.

DETAILED DESCRIPTION OF THE PREFERRED EMBODIMENTS

Figure 1:
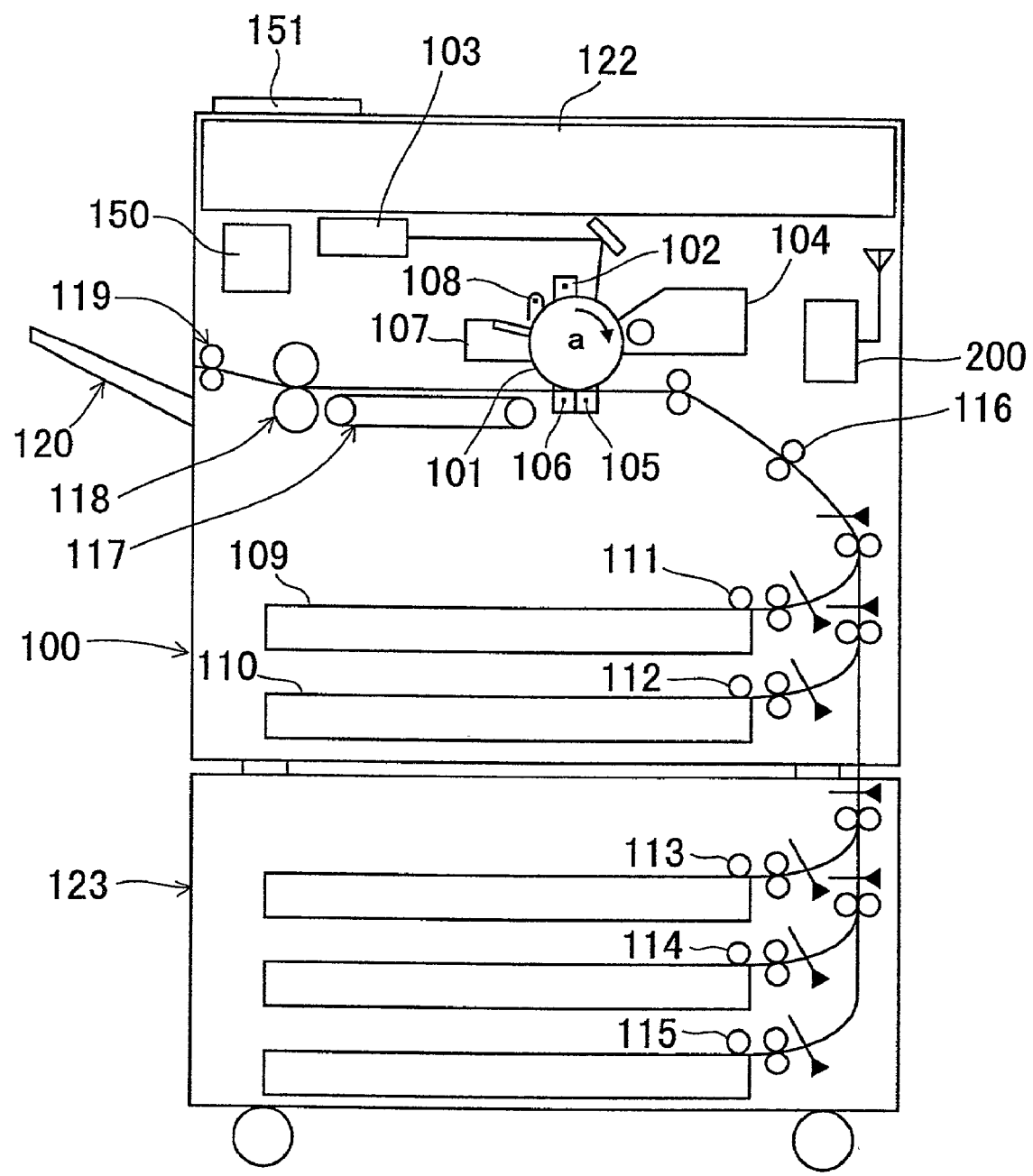
FIG. 1 is a schematic structural view showing an image forming apparatus in an image forming system according to an embodiment of the present invention.

FIG. 1 is a schematic structural view showing an image forming apparatus in an image forming system according to an embodiment of the present invention.

The image forming apparatus 100 is provided with a photosensitive drum 101 rotatable in the direction of the arrow "a" at an approximately central portion thereof. Provided around the photosensitive drum 101 are an electrification device 102 for forming an image by electrophotography processing, a laser-beam scanning optical system 103, a developing device 104, a transcribing device 105, a paper detaching device 106, a cleaning device 107 for eliminating residual toner on the photosensitive drum 101, an eraser lamp 108 for removing residual charges, etc.

The detail explanation of the principle of electrophotography will be omitted since it is a well-known technology.

An electrical signal is converted into an optical signal by the laser-beam scanning optical system 103 based on the image information inputted from the scanning optical-system apparatus 122, and exposes the charged photosensitive drum 101. In this way, an electrostatic latent image is formed on the photosensitive drum 101 and then developed by the developing device 104. Thus, an image is formed on the photosensitive drum 101.

In the lower portion of the image forming apparatus 100, a plurality of paper-feed cassettes 109 and 110 and a paper-feed transport device 123 are provided. Recording papers accommodated in the paper-feed cassettes 109 and 110 are supplied to the image formation portion side one by one.

The recording paper is selectively fed by the feed rollers 111, 112, 113, 114 and 115 from the paper-feed transport device 123 or other paper-feed cassettes, and is stopped by the timing roller 116. Thereafter, this recording paper is synchronized with the image formed on the photosensitive drum 101, and is sent to the transcribing device 105 side. Then, the image on the photosensitive drum 101 is transcribed onto the recording paper. The recording paper on which the image is transcribed is conveyed to the fixing device 118 via the separator 106 by the conveyance belt 117, and the toner is fixed with heat. Thereafter, the recording paper is discharged onto the discharge tray 120 from the discharge roller 119.

Figure 2:
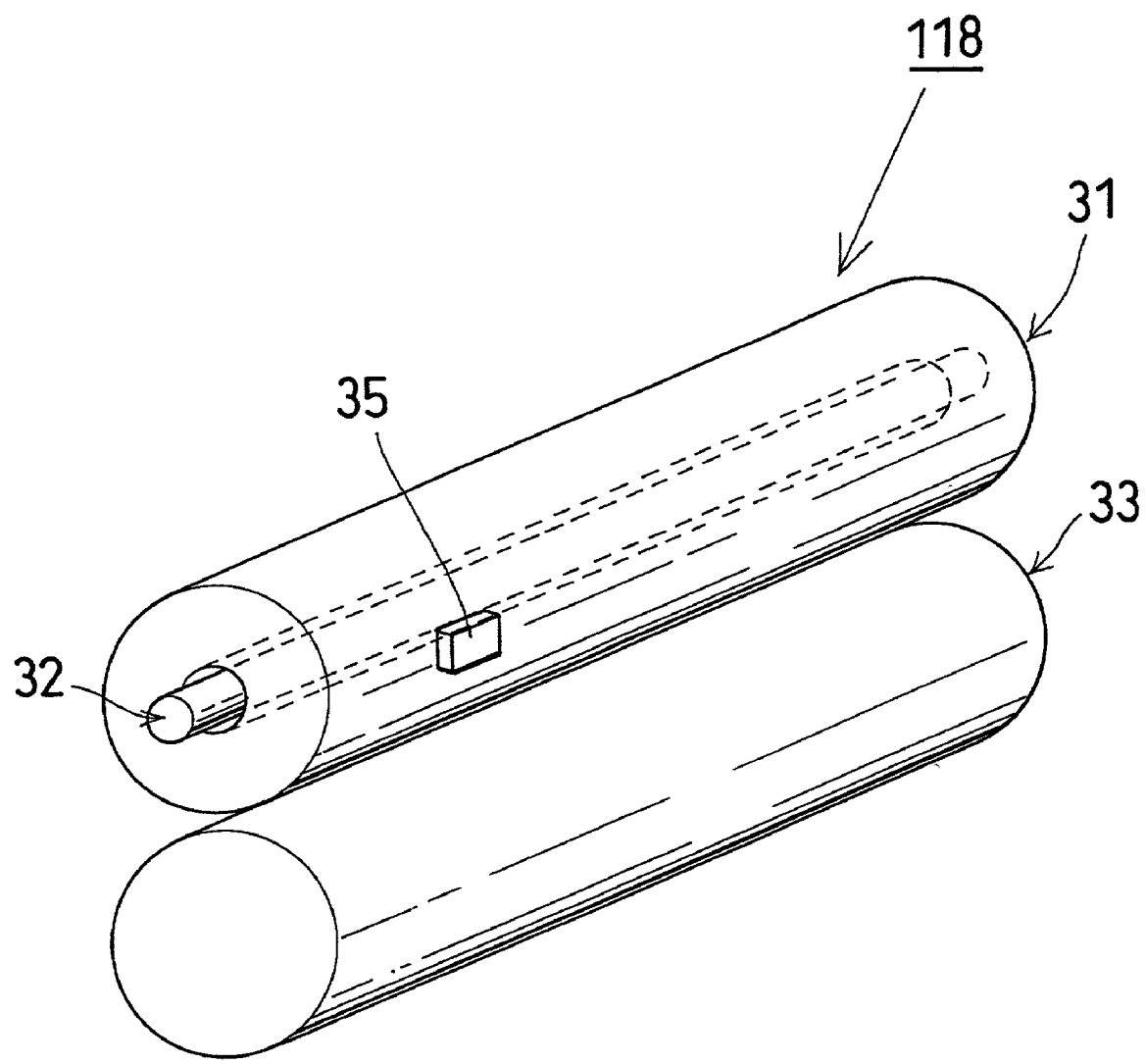
FIG. 2 is a perspective view showing a fixing device shown in FIG. 1.

The fixing device 118 is provided with an upper fixing roller 31 and a lower pressure roller 33, as shown in FIG. 2. Inserted in the fixing roller 31 along the longitudinal direction thereof is a bar-shaped heater 32. A thermistor 35 for measuring the temperature of the fixing roller 31 is disposed near the fixing device 118.

Furthermore, the image forming apparatus 100 is provided with an operation panel 151 equipped with a display such as a liquid crystal panel and an operating portion controller 150 for controlling a liquid crystal display/various key inputs of the operation panel 151.

Figure 3:
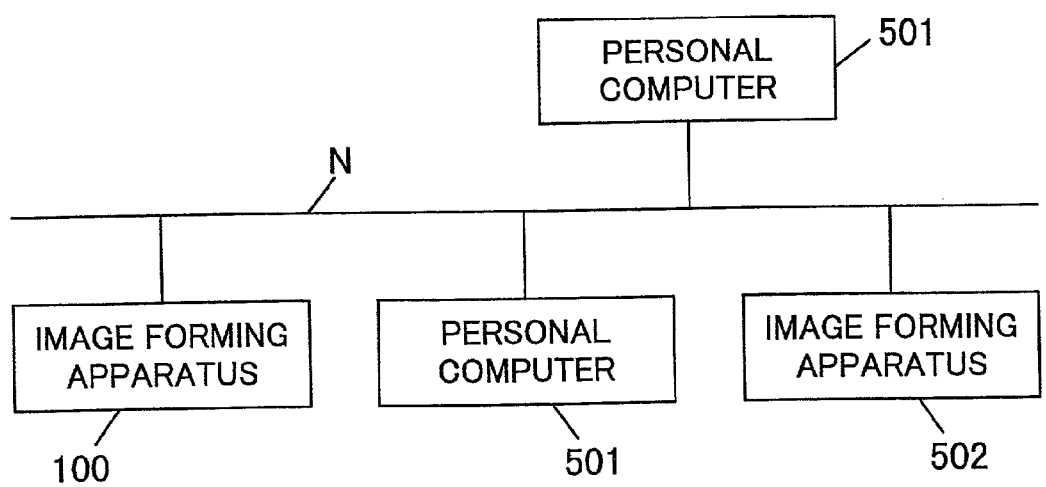
FIG. 3 is an example of a network structure to which image forming apparatuses shown in FIG. 1 are connected.

As shown in FIG. 3, an image forming apparatus 100 is connected with a Network N so that a job for outputting an image from a personal computers 501 (i.e. external device), another image forming apparatus 502 and the like (hereinafter referred to as "distribution document") can be distributed to the image forming apparatus 100. Thus, the image forming apparatus 100 functions as a printer too.

Furthermore, the image forming apparatus 100 is provided with a communicating portion 200. This communicating portion 200 performs a wireless communication between the image forming apparatus 100 and a portable terminal provided corresponding to the distribution origin of the personal computer 501, etc. connected to the Network N. The aforementioned portable terminal is carried by a user who distributed the distribution document.

Figure 4:
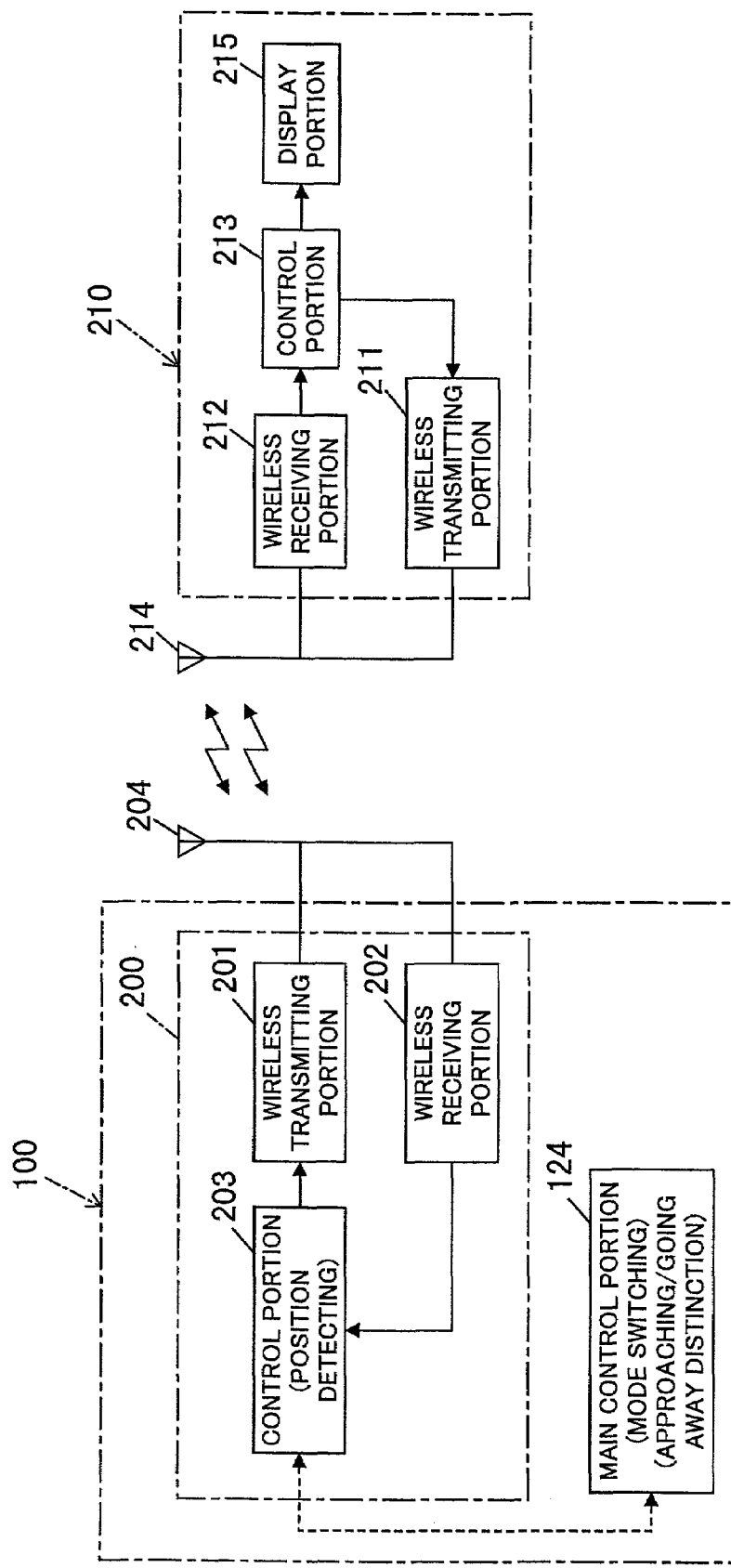
FIG. 4 is a block diagram showing a structure concerning wireless communication between an image forming apparatus and a portable terminal in an image forming system.

FIG. 4 is a block diagram showing the electric structure for performing a wireless communication between the image forming apparatus 100 and the portable terminal.

As shown in FIG. 4, the image forming apparatus 100 is equipped with a main control portion 124 which controls the whole operation of the image forming apparatus 100 and the communicating portion 200.

Figure 5:
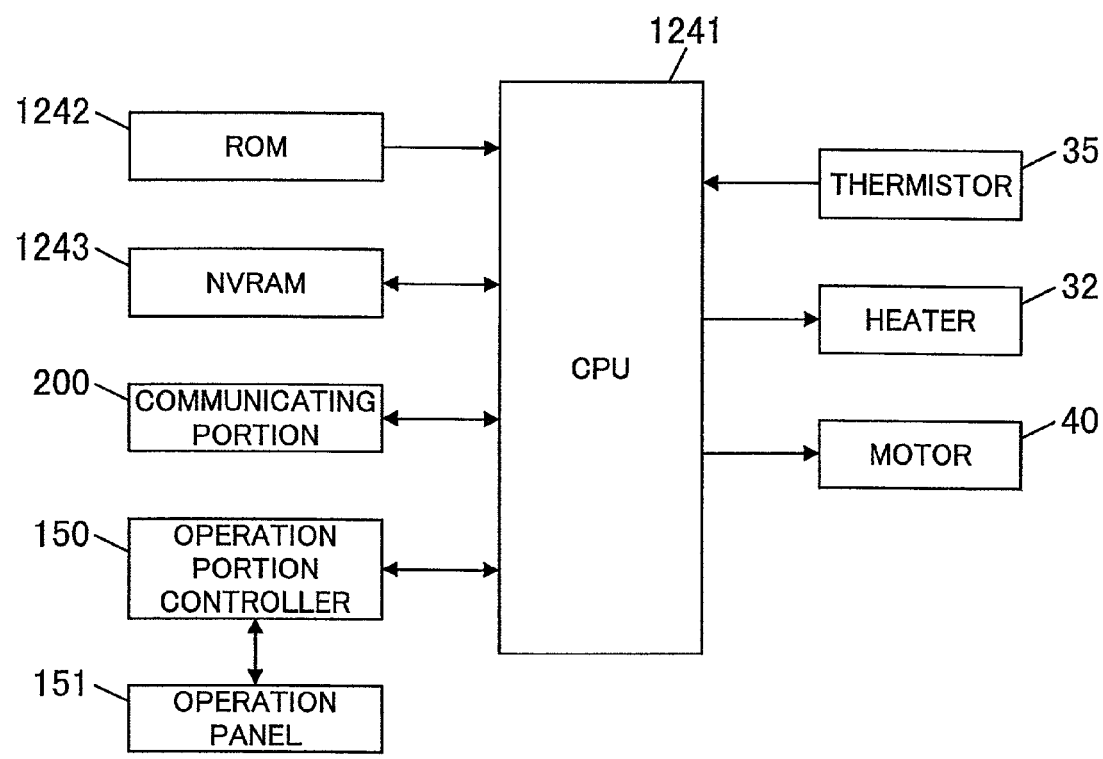
FIG. 5 is a schematic structural view of the main control portion of the image forming apparatus shown in FIG. 4.

As shown in FIG. 5, the aforementioned main control portion 124 is equipped with a central processing unit (hereinafter "CPU") 1241, a ROM 1242 storing the program that the CPU 1241 performs and an NVRAM 1243 used as the processing working area of the CPU 1241. The NVRAM 1243 stores the self-ID, an ID of the portable terminal corresponding to the computer as a distribution origin and the like.

Other than the ROM 1242 and the NVRAM 1243 in the main control portion 124, the aforementioned thermistor 35, the aforementioned heater 32, the aforementioned motor 40 as a driving source of the aforementioned fixing device 118, the aforementioned communicating portion 200 and the aforementioned operation portion controller 150 are connected to the CPU 1241, respectively, which are located outside the main control portion 124. That is, when a distribution document is received via the Network N from the personal computer 501, etc. connected with the Network, the CPU 1241 specifies the distribution origin and sends out the notice destination ID, which is the identification information of the portable terminal 210 corresponding to the distribution origin, to the communicating portion 200.

Furthermore, in the below-mentioned mode switching control, the CPU 1241 controls the temperature of the heater 32 for heating the fixing device 118 based on the temperature of the fixing device 118 measured by the aforementioned thermistor 35. Furthermore, in the below-mentioned mode switching control, the CPU 1241 controls the motor 40 which drives the fixing device 118. Furthermore, The CPU performs, in the below-mentioned operation panel control, a corresponding control when the notice destination ID of the portable terminal 210 and/or the output directions are inputted via the operation panel 151 by the user.

The communicating portion 200 includes a wireless transmitting portion 201, a wireless receiving portion 202, a control portion 203, an antenna 204, etc. The communication portion 200 is constituted such that the information showing that the distribution document distributed from the personal computer 501, etc. on the Network N exists in the image forming apparatus 100 is transmitted to the aforementioned portable terminal 210.

The aforementioned control portion 203 functions as a position detector which detects the position of the portable terminal 210, i.e., the position of the user carrying the portable terminal 210. In this embodiment, the control portion detects the position of the portable terminal 210 by detecting the distance between the image forming apparatus 100 and the portable terminal 210. Furthermore, in accordance with the distance data, which is a position detection result, the aforementioned main control portion 124 functions as a mode switching means which switches from one mode of a plurality of modes concerning power consumption to another, and/or functions as a discriminator which discriminates whether or not the portable terminal 210 is approaching the image forming apparatus 100 or whether or not the portable terminal 210 is going away from the image forming apparatus 100, based on the detected distance between the portable terminal 210 and the image forming apparatus 100.

In this embodiment, although the communicating portion 200 is built in the image forming apparatus 100, it may be externally attached to the image forming apparatus 100 or may be detachably equipped to the image forming apparatus. In cases where the communicating portion 200 is detachably attached to the image forming apparatus 100, since the communicating portion 200 can be moved towards the good directive direction according to the electric wave state, it becomes possible to maintain a good communication state.

On the other hand, the portable terminal 210 includes a wireless transmitting portion 211, a wireless receiving portion 212, a control portion 213, an antenna 214, a display portion 215, etc.

Figure 6:
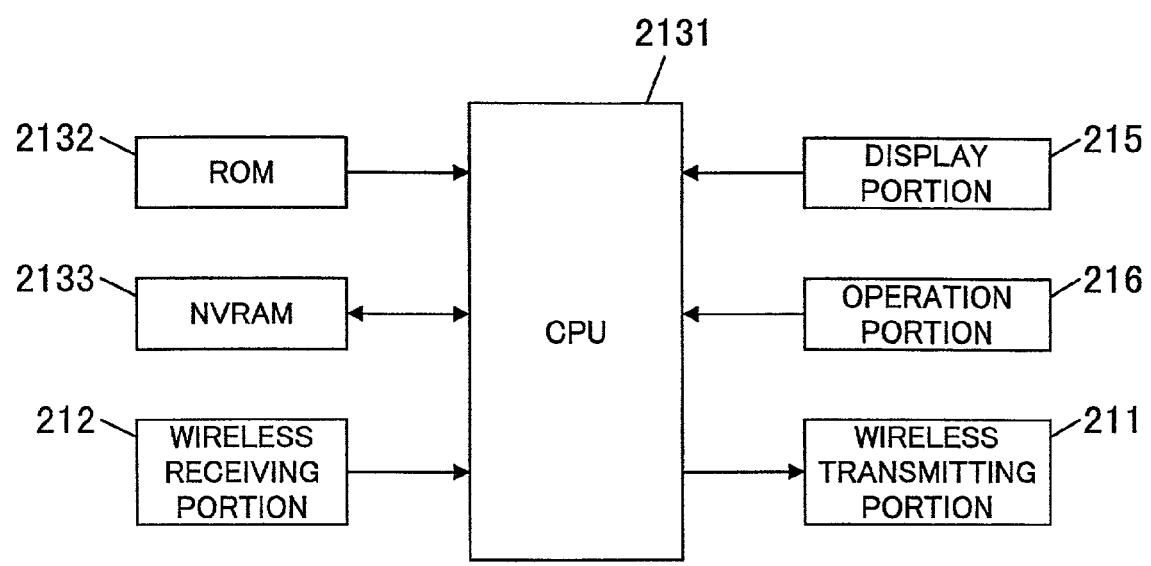
FIG. 6 is a schematic structural view of the control portion of the portable terminal shown in FIG. 4.

As shown in FIG. 6, the aforementioned control portion 213 is equipped with a CPU 2131, a ROM 2132 which stores the program that the CPU 2131 executes, and an NVRAM 2133 used as a processing working area of the CPU 2131.

Other than the ROM 2131 and the NVRAM 2133 in the control portion 213, connected to the CPU 2131 are a wireless transmitting portion 211, a wireless receiving portion 212, a display portion 215 and an operation portion 216, respectively, which are located outside the control portion 213. That is, the CPU 2131 extracts the notice destination ID (ID of the portable terminal) and the notice origin ID (ID of the image forming apparatus) from the signal (information showing that the distribution document exists in the image forming apparatus 100) sent from the image forming apparatus 100 and received by the wireless receiving portion 212. The CPU also compares the self-ID previously stored in the NVRAM 2133 with the extracted notice destination ID.

Furthermore, the CPU 2131 displays the image forming apparatus 100 corresponding to the notice origin ID extracted from the communication data on a display 215 when the notice destination ID extracted from the communication data transmitted from the image forming apparatus 100 coincides with the self-ID. In addition, the CPU 2131 controls each portion according to various operations of the operation portion 216 made by the user.

Figure 7:
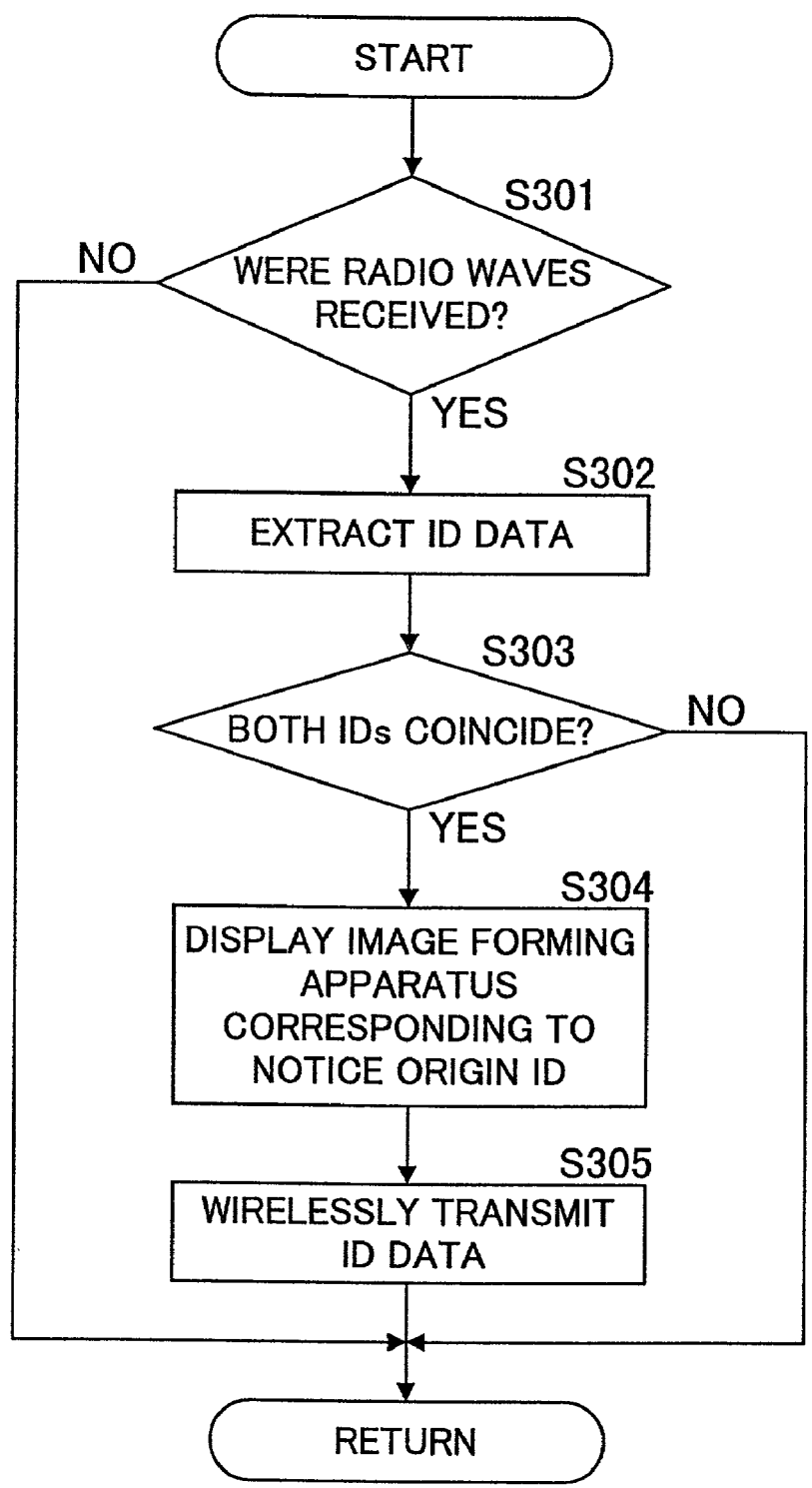
FIG. 7 is a flow chart showing the operation of the portable terminal.

Next, the operation of the portable terminal 210 will be explained with reference to the flow chart shown in FIG. 7.

In the following explanation and the attached drawings, a step will be abbreviated as "S."

First, in S301, it is discriminated whether or not the control portion 213 received the radio waves from the communicating portion 200 of the image forming apparatus 100 via the wireless receiving portion 212. When the radio waves were received (YES in S301), the received radio waves are demodulated into demodulated signals, and the communication data is taken out of the demodulated signals and sent to the control portion 213. When the radio waves were not received (NO in S301), the return returns.

In S302, the control portion 213 extracts the notice destination ID and the notice origin ID from the communication data sent from the wireless receiving portion 212.

In S303, the control portion 213 compares the self-ID previously registered in the NVRAM 2133 with the extracted notice destination ID. When both IDs coincide with each other (YES in S303), the control portion sends the notice origin ID to the display portion 215 and at the same time wirelessly transmits the communication data containing the self-ID and the notice origin ID to the wireless transmitting portion 211 as reply-information to the image forming apparatus 100. When both the IDs do not coincide with each other (NO in S303), the routine returns.

In S304, the display portion 215 displays the image forming apparatus 100 corresponding to the notice origin ID sent from the aforementioned control portion 213. Subsequently, in S305, the wireless transmitting portion 211 superposes the communication data from the control portion 213 on modulating signals by a predetermined method, such as an FM modulation method or a PCM modulation method, and transmits the superposed signals to the image forming apparatus 100 as radio waves, and then the routine returns.

Figure 8:
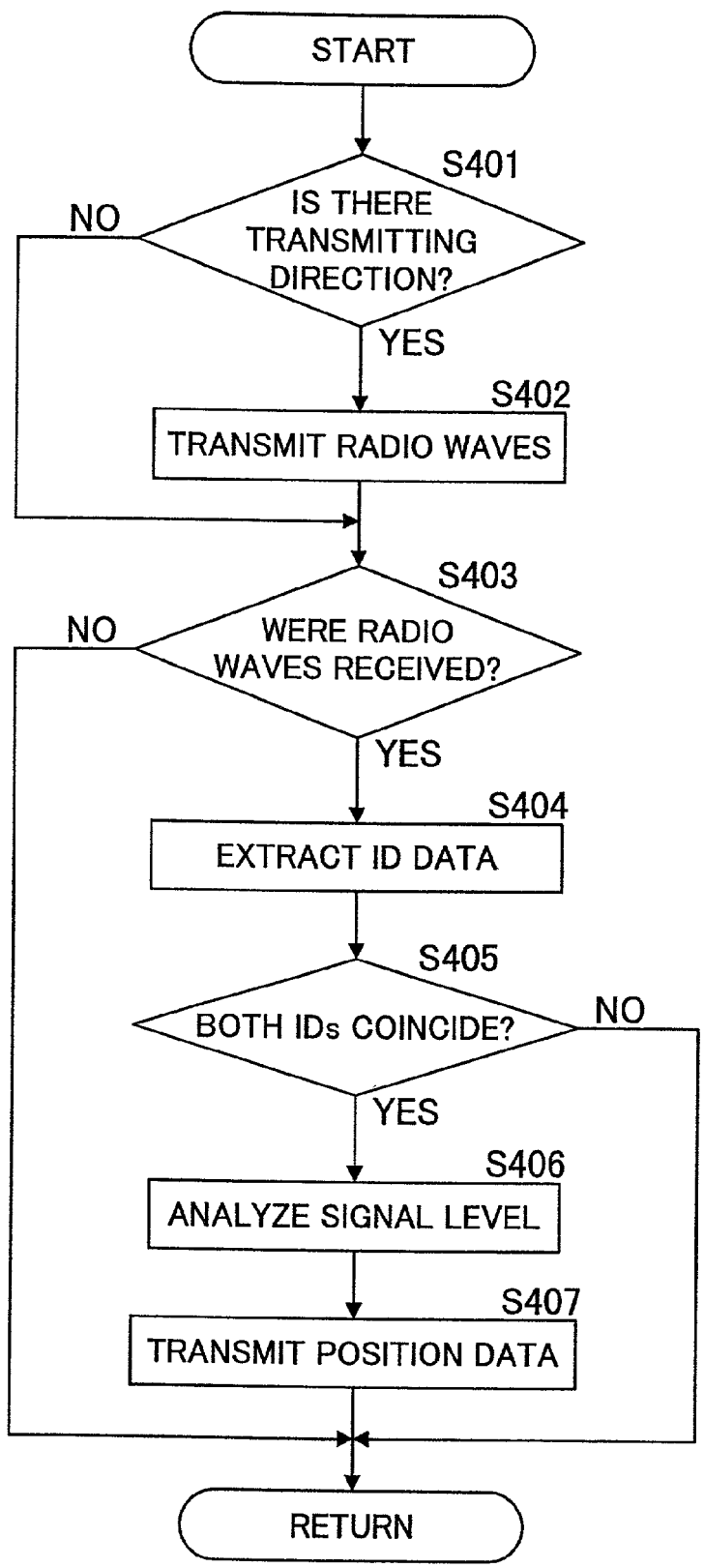
FIG. 8 is a flow chart showing the operation of the communicating portion in the image forming apparatus.

Next, the operation of the communicating portion 200 of the image forming apparatus 100 will be explained with reference to the flow chart of FIG. 8.

When the distribution document (image data) to be processed by the image forming apparatus 100 is distributed from the personal computer 501 or the like through the Network N, the main control portion 124 will send the ID of the portable terminal 210 corresponding to the personal computer 501 or the like which is the distribution origin of the distribution document to the control portion 203 as the notice destination ID data. The control portion 203 stores the sent notice destination ID in a memory portion (not shown), and sends the communication data that the self-ID previously registered in the memory portion is added to the notice destination ID to the wireless transmitting portion 201 as information showing that there is a distribution document waiting for being outputted. The wireless transmitting portion 201 transmits the communication data to the portable terminal 210.

First, in S401, the wireless transmitting portion 201 judges whether or not there is a transmitting direction of the communication data. When there is a transmitting direction (YES in S401), in S402, the communication data sent from the aforementioned control portion 203 is superposed on modulating signals by a prescribed method such as FM modulation method or PCM modulation method, and is transmitted to the portable terminal 210 side as electric waves. When there is no transmitting direction (NO in S401), the routine proceeds to S403.

In S403, it is judged whether or not the wireless receiving portion 202 received the radio wave (reply-information) from the aforementioned portable terminal 210. When the radio waves from the portable terminal 210 are received (YES in S403), the received waves are demodulated, and communication data are taken out from the demodulated signal and send to the control portion 203. At the same time, the wireless receiving portion 202 sends the position signal whose level changes according to the strength of the received radio waves to the control portion 203. When the radio waves from the portable terminal 210 are not received (NO in S403), the routine returns.

In S404, the control portion 203 extracts the ID of the portable terminal 210 and the notice origin ID from the communication data sent from the wireless receiving portion 202.

Subsequently, in S405, the ID of the portable terminal 210 extracted by the control portion 203 is compared with the notice destination ID stored in the memory portion, and the extracted notice origin ID is also compared with the self-ID of the image forming apparatus 100 previously registered in the memory portion.

When the aforementioned two IDs coincide (YES in S405), in S406, the control portion 203 analyzes the position signal outputted from the wireless receiving portion 202. On the other hand, when the aforementioned two IDs do not coincide (NO in S404), the routine returns.

Thereafter, in S407, the control portion 203 converts the position signal into a position data (distance data), and sends it to the main control portion 124. Then, the routine returns.

In the aforementioned embodiment, although the communication data consists of the notice origin ID and the notice destination ID, the communication data may consist of only the notice destination ID in cases where only one image forming apparatus 100 is included.

It becomes more convenient by adding a distribution origin ID to the communication data to be transmitted from the image forming apparatus 100 and displaying the image forming apparatus 100, the distribution origin personal computer 501, etc. in the portable terminal 210.

In addition, if the display portion 215 of the portable terminal 210 is replaced with such a structure that the signal arrival is notified to the user by sounds or vibrations, the miniaturization of the portable terminal 210 can be attained as compared with the case where the display portion 215 consists of a screen display.

The main control portion 124 of the image forming apparatus 100 receives the distance data of the portable terminal 210, i.e., the distance data between the current position of the user carrying the portable terminal 210 and the position of the image forming apparatus 100, from the control portion 203, and switches from one mode concerning power consumption to another in accordance with the distance data.

Figure 9:
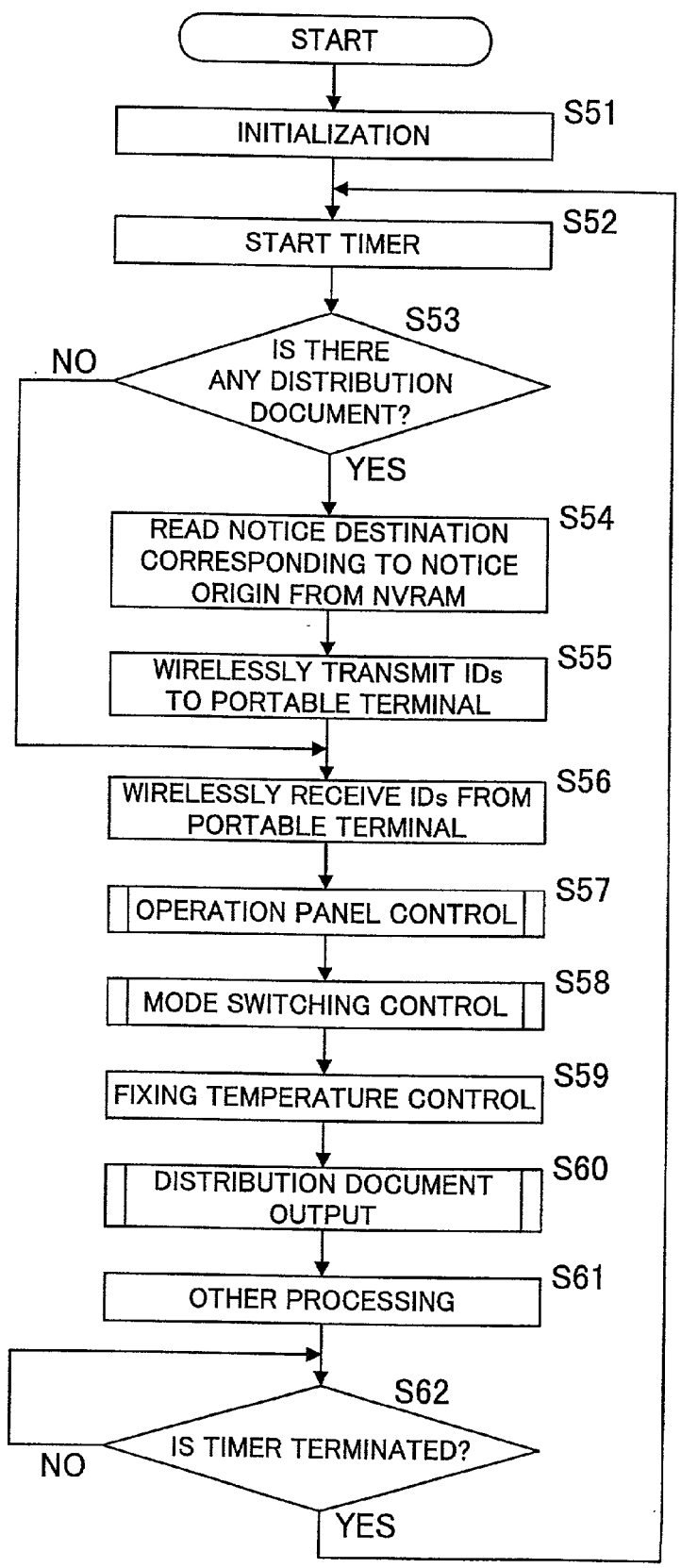
FIG. 9 is a flow chart showing the operation of the image forming apparatus.

FIG. 9 is a flow chart showing the operation of the aforementioned image forming apparatus 100 according to the first embodiment. This operation will be performed by the main control portion 125 that performs processing in accordance with the program stored in the ROM 1242.

First, In S51, each portion is initialized, and then the internal timer of the CPU 1241 is started in S52.

In S53, it is judged whether or not there is any distribution document (image data) from the personal computer 501 (i.e. external device) or the like. When there is a distribution document (YES in S53), in S54, the notice destination ID of the portable terminal 210 corresponding to the personal computer 501 or the like which is the distribution origin of the distribution document is read from the NVRAM 1243. Furthermore, in S55, the notice origin ID and the notice destination ID which are the information that there is an output-waiting distribution document are transmitted to the corresponding portable terminal 210 via the wireless transmitting portion 201. On the other hand, when there is no distribution document in S53 (NO in S54), the routine proceeds of S56.

When the notice origin ID and the notice destination ID which are reply-information from the portable terminal 210 replying to the information that there is an output-waiting distribution document are received by the wireless receiving portion 202 in S56. Operation panel control processing is performed in S57. Furthermore, mode switching control processing concerning power consumption is performed in S58. These operation panel control and mode switching control processing will be detailed later.

In S59, the temperature of the fixing device 118 is controlled based on the mode switching control processing in S58.

In S60, output processing of the distribution document is performed. Subsequently, other processing is performed in S61. As for the distribution document output processing, the explanation will be made later.

In S62, it is judged whether or not the aforementioned timer is terminated. When the timer is terminated (YES in S62), the routine returns to S52. The processing including this timer termination will be repeated as one routine. When the aforementioned timer is not terminated (NO in S62), the judgment processing will be repeated until the timer is terminated.

Figure 10:
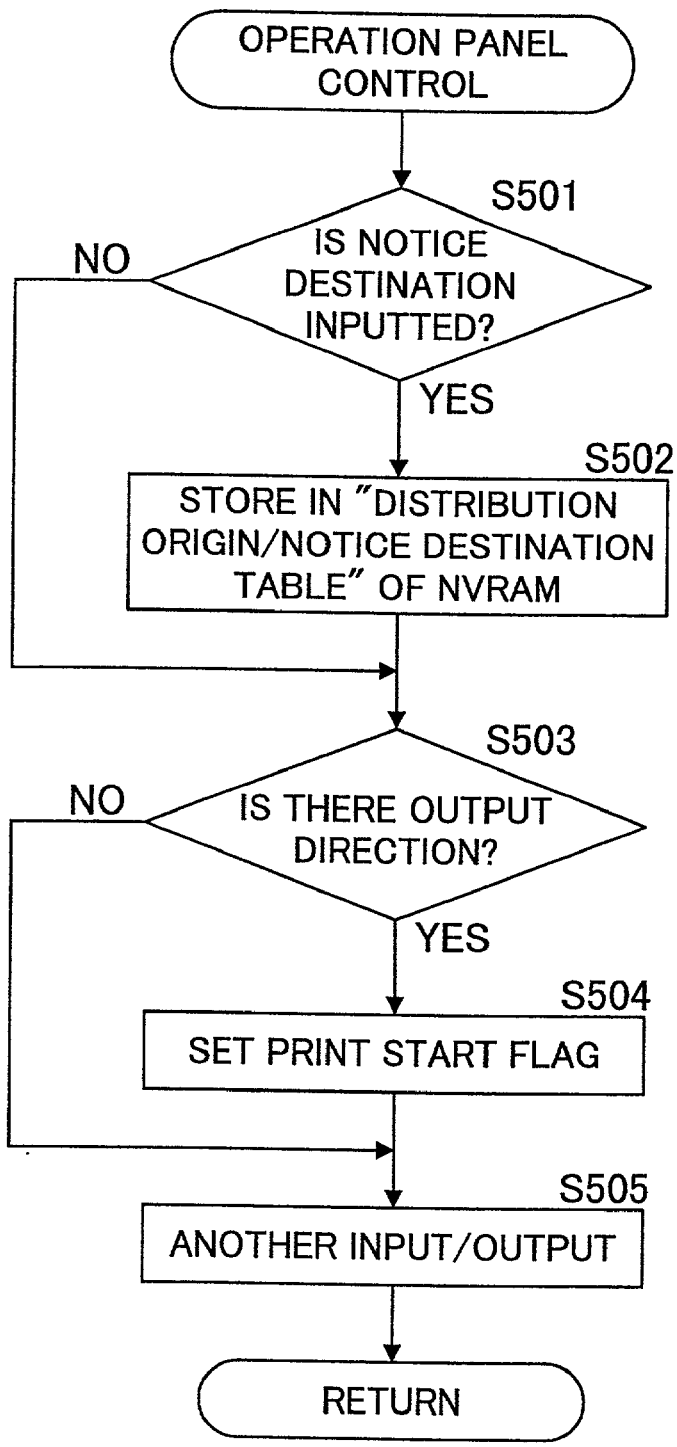
FIG. 10 is a flow chart showing a first example of the subroutine of the operation-panel control shown in FIG. 9.

FIG. 10 is a flow chart showing the subroutine of the aforementioned panel control processing (S57 in FIG. 9).

First, in S501, the main control portion 124 judges whether or not the notice destination ID of the portable terminal 210 is inputted into the operation panel 151 by the user. When the notice destination ID of the portable terminal 210 is inputted (YES in S501), the notice destination ID of the portable terminal 201 is stored in the distribution origin/notice destination table of the NVRAM 1243 in S502. Thereafter, the routine proceeds to S503. When the notice destination ID of the portable terminal 210 is not inputted (NO in S501), the routine proceeds to S503.

In S503, it is judged whether or not there is an output direction by the user. When there is an output direction (YES in S503), a print start flag is set in S504. Thereafter, the routine proceeds to S505. When there is no output direction (NO in S503), the routine proceeds to S505.

In S505, another input/output control processing is performed, and then the routine returns.

Figure 11:
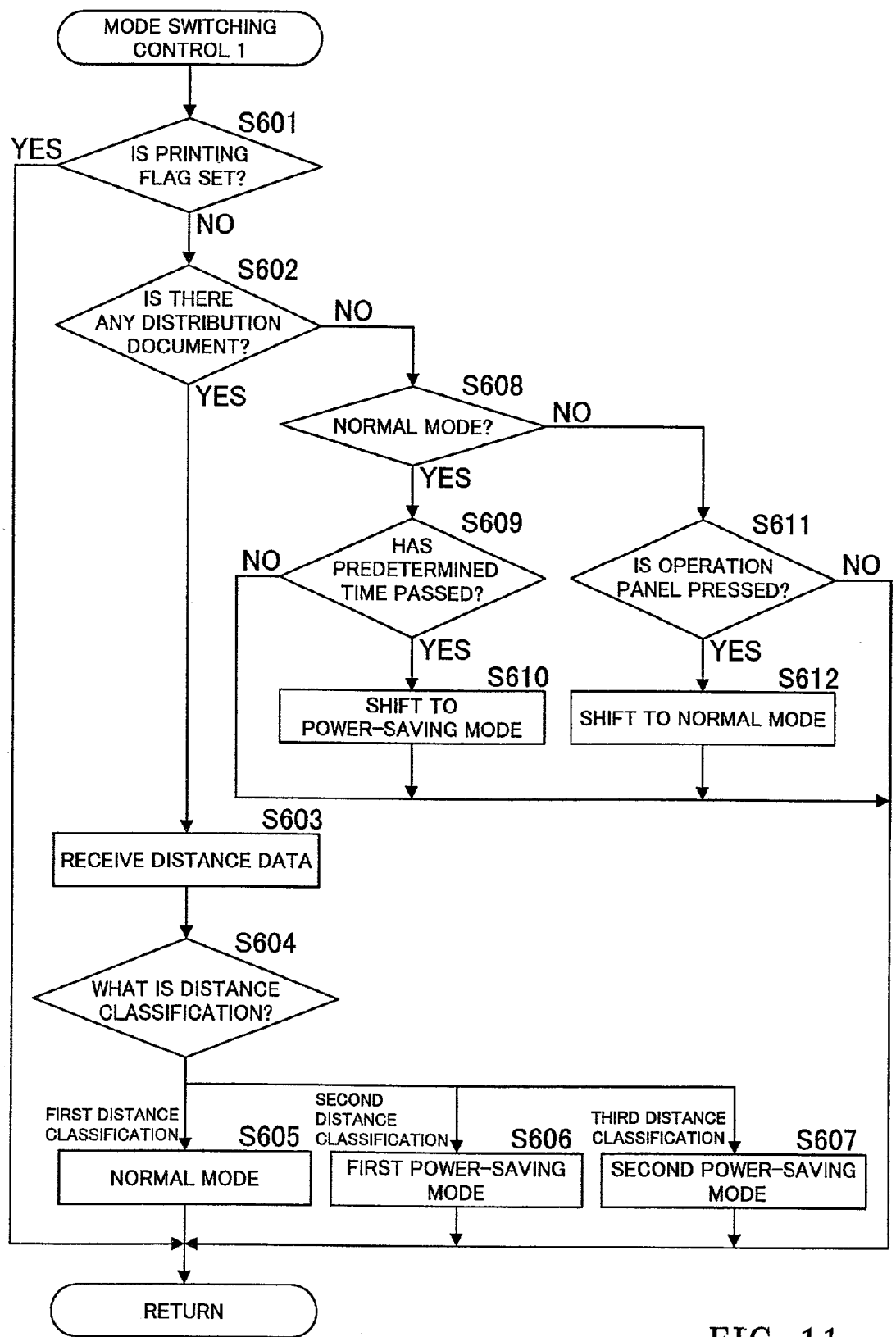
FIG. 11 is a flow chart showing a first example of the subroutine of the mode switching control processing shown in FIG. 9.

FIG. 11 is a flow chart showing the subroutine of the first example of the aforementioned mode switching control processing (S58 in FIG. 9).

Figure 12:
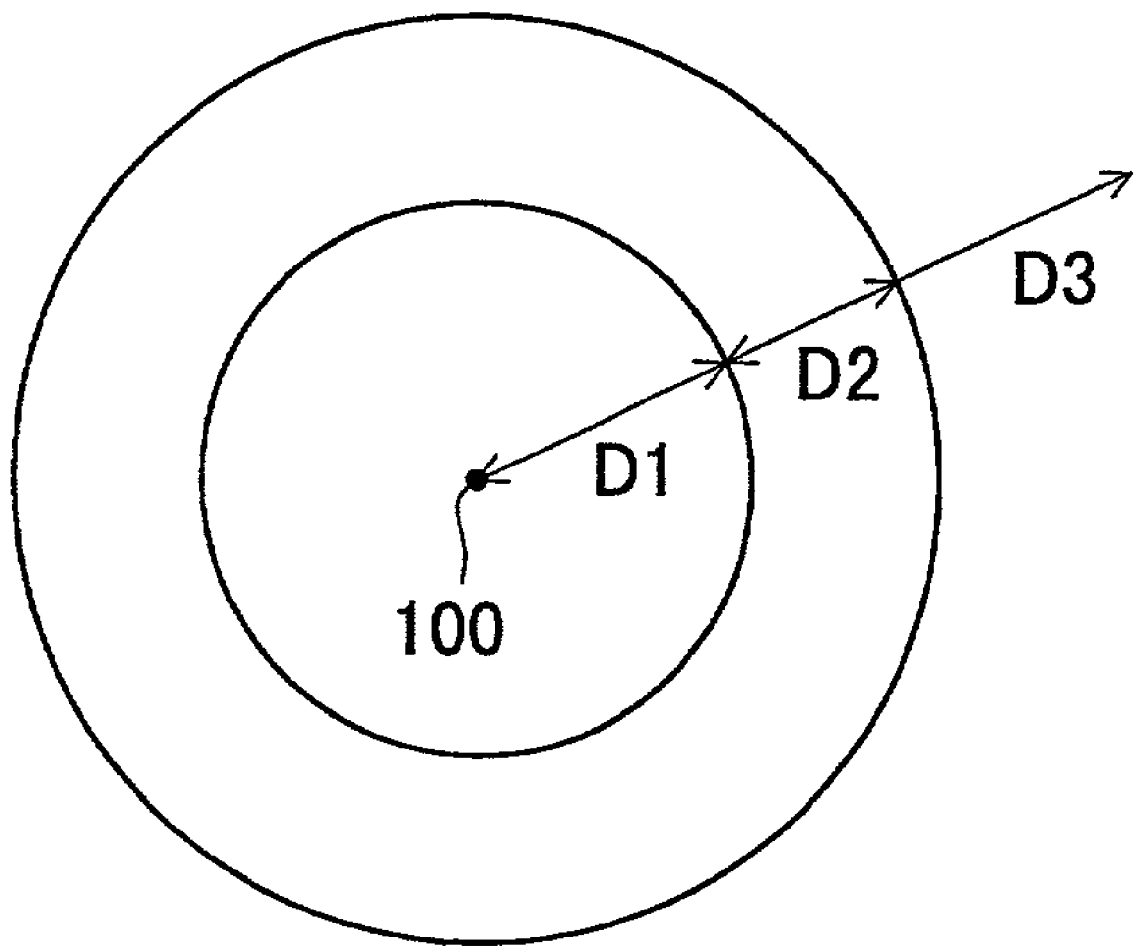
FIG. 12 is an explanatory drawing showing the distance classification for detecting the current position of the portable terminal.

Here, the main control portion 124 performs mode switching control of three modes, a normal mode, a first power-saving mode and a second power-saving mode, in accordance with the distance data computed by the control portion 203. Concretely, the distance data of the portable terminal 210 is divided into three classifications D1, D2 and D3, as shown in FIG. 12, and the aforementioned mode switching control is performed in accordance with the classifications D1, D2 and D3. When the distance data falls within the range of the first distance classification D1 which is the nearest to the image forming apparatus 100, the mode is switched to the normal mode. When the distance data falls within the range of the third distance classification D3 which is furthest from the image forming apparatus 100, the mode is switched to the second power-saving mode. When the distance data falls within the range of the second distance classification D2 which is a middle-distance, the mode is switched to the first power-saving mode.

That is, in S601 of FIG. 11, the main control portion 124 judges whether or not the printing flag is set. When the printing flag is not set, i.e., it is not being printed (NO in S601), the routine proceeds to S602. When the printing flag is set, i.e., it is being printed (YES in S601), the routine returns.

In S602, it is judged whether or not there is an output-waiting distribution document. When there is an output-waiting distribution document (YES in S602), in S603, the main control portion 124 receives the distance data concerning the distance between the current position of the user carrying the corresponding portable terminal 210 and the position of the image forming apparatus 100 from the control portion 203. In S604, the main control portion 124 discriminates the aforementioned distance classifications D1–D3, and performs mode switching processing of the image forming apparatus 100 based on the discriminated result.

When it is judged that the distance falls within the first distance classification D1, the mode is switched to the normal mode in S605. When judged that the distance falls within the second distance classification D2, the mode is switched to the first power-saving mode in S606. When judged that the distance falls within the third distance classification D3, the mode is switched to the second power-saving mode in S607. Then, the routine returns.

In cases where it is set that the fixing device control temperature is 180° C. in the normal mode, 160° C. in the first power-saving mode and 130° C. in the second power-saving mode, the main control portion 124 controls the heater 32 of the fixing device 118 so as to maintain the temperature of the fixing device 118 at 180° C. in the normal mode, 160° C. in the first power-saving mode and 130° C. in the second power-saving mode, respectively.

Therefore, the mode of the image forming apparatus switches from the second power-saving mode to the first power-saving mode and then from the first power-saving mode to the normal mode as the user carrying the portable terminal 210 approaches the image forming apparatus 100.

On the other hand, when there is no output-waiting distribution document (NO in S602), in S608, the main control portion 124 judges whether or not the mode is the normal mode. When it is judged that the current mode is the normal mode (YES IN S608), in S609, it is judged whether a certain time has passed. When a certain time has passed (YES in S609), the current mode is shifted to a power-saving mode in S610, thereafter the routine returns. This power-saving mode may be the same as the second power-saving mode or more effective power-saving mode.

When the current mode is not the normal mode (NO in S608), in S611, it is judged whether the operation panel 151 is pressed. When the operation panel 151 is pressed (YES in S611), the current mode shifts to the normal mode in S612. When the operation panel 151 is not pressed (NO in S611), the routine returns.

By the way, in the power-saving modes for decreasing the control temperature of the fixing device 118 in the image forming apparatus 100, power consumption can be decreased as compared with cases where the temperature of the fixing device 118 is maintained to the normal temperature. On the other hand, even if a user want to use the image forming apparatus 100, the user cannot use it immediately and has to wait for a predetermined time until the warming-up is completed. Furthermore, at the control temperature that requires less waiting time, power-saving effect can be hardly obtained.

Thus, as in the aforementioned embodiment, the mode in which the control temperature of the fixing device 118 is changed is selected depending on the distance between the current position of the user carrying the portable terminal 210 and the position of the image forming apparatus 100. This enables an efficient warm-up of the image forming apparatus considering the user's approaching time to the image forming apparatus 100 by switching from the power-saving mode to the normal mode stepwise as the user approaches the image forming apparatus 100. Accordingly, a waiting time of a user arrived at the image forming apparatus can be decreased, resulting in an optimal power-saving effect.

In this embodiment, although the control temperature of the fixing device 118 is classified into three classifications D1, D2 and D3, the present invention is not limited to this. The control temperature may be further subdivided, which can further enhance the power-saving effect. Alternatively, the control temperature of the fixing device 118 at the time of power-saving mode may be fixed and the image forming apparatus may be switched between the normal mode and the power-saving mode.

Figure 13:
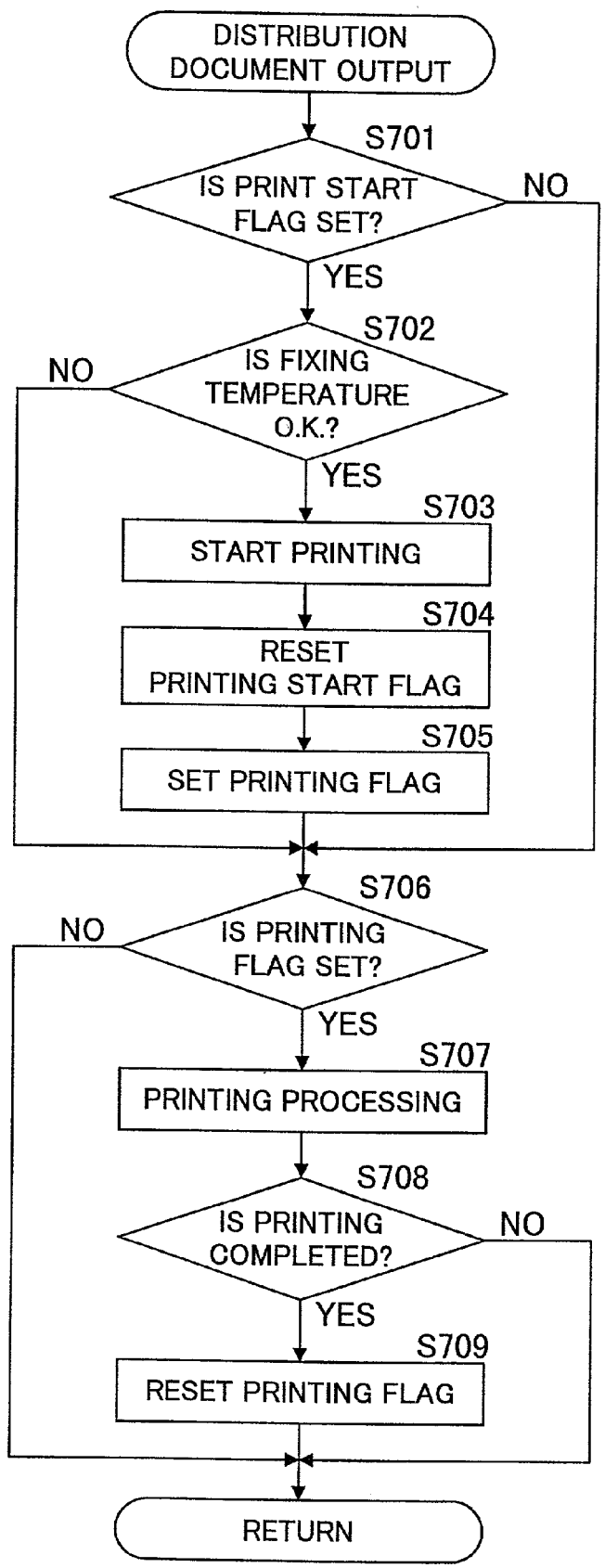
FIG. 13 is a flow chart showing an example of the subroutine of the distribution document output shown in FIG. 9.

FIG. 13 is a flow chart showing the subroutine of the aforementioned distribution document output processing (S60 in FIG. 9).

First, the main control portion 124 judges whether the print start flag is set in S701. When the print start flag is set (YES in S701), the routine proceeds to S702. When the print start flag is not set (NO in S701), and the routine proceeds to S706.

In S702, it is judged whether the fixing temperature is O.K., in other words, whether the temperature of the fixing device 118 is set as the printable temperature of 180° C. When the fixing temperature is O.K. (YES in S702), the printing processing starts in S703. Thereafter, in S704, the print start flag is reset. Subsequently, in S705, the printing flag is set, and then the routine proceeds to S706. When the fixing temperature is not O.K. (NO in S702), the routine proceeds to S706.

In S706, it is judged whether the printing flag is set. When the printing flag is set (YES in S706), the print processing is continuously performed in S707. When the printing flag is not set (NO in S706), the routine returns.

In S708, it is judged whether the print is completed. When the print is completed (YES in S708), the printing flag is reset in S709, and then the routine returns. When the print is not completed (NO in S708), the routine returns.

Next, the subroutine of the second example of the aforementioned mode switching control processing (S58 in FIG. 9) will be explained with reference to the flow chart shown in FIG. 14.

In this example, the control unit controller 150 of the image forming apparatus 100 performs a liquid crystal display/various key input control of the operation panel 151 based on the direction of the CPU 1241, and controls so as to turn off the liquid crystal display in the power-saving modes.

The power-saving modes include a panel-turning-off mode, a preheating mode and a sleep mode. In the panel-turning-off mode, only the operation portion controller 150 of the image forming apparatus 100 is shifted to a power-saving mode. In the preheating mode, the operation portion controller 150 and the main control portion 124 are shifted to a power-saving mode. In the sleep mode, the power supply of the operation panel controller 150 is turned off and the signal transfer operation with the communicating portion 200 of the main control portion 124 and the operation of the communicating portion 200 become available.

Figure 14:
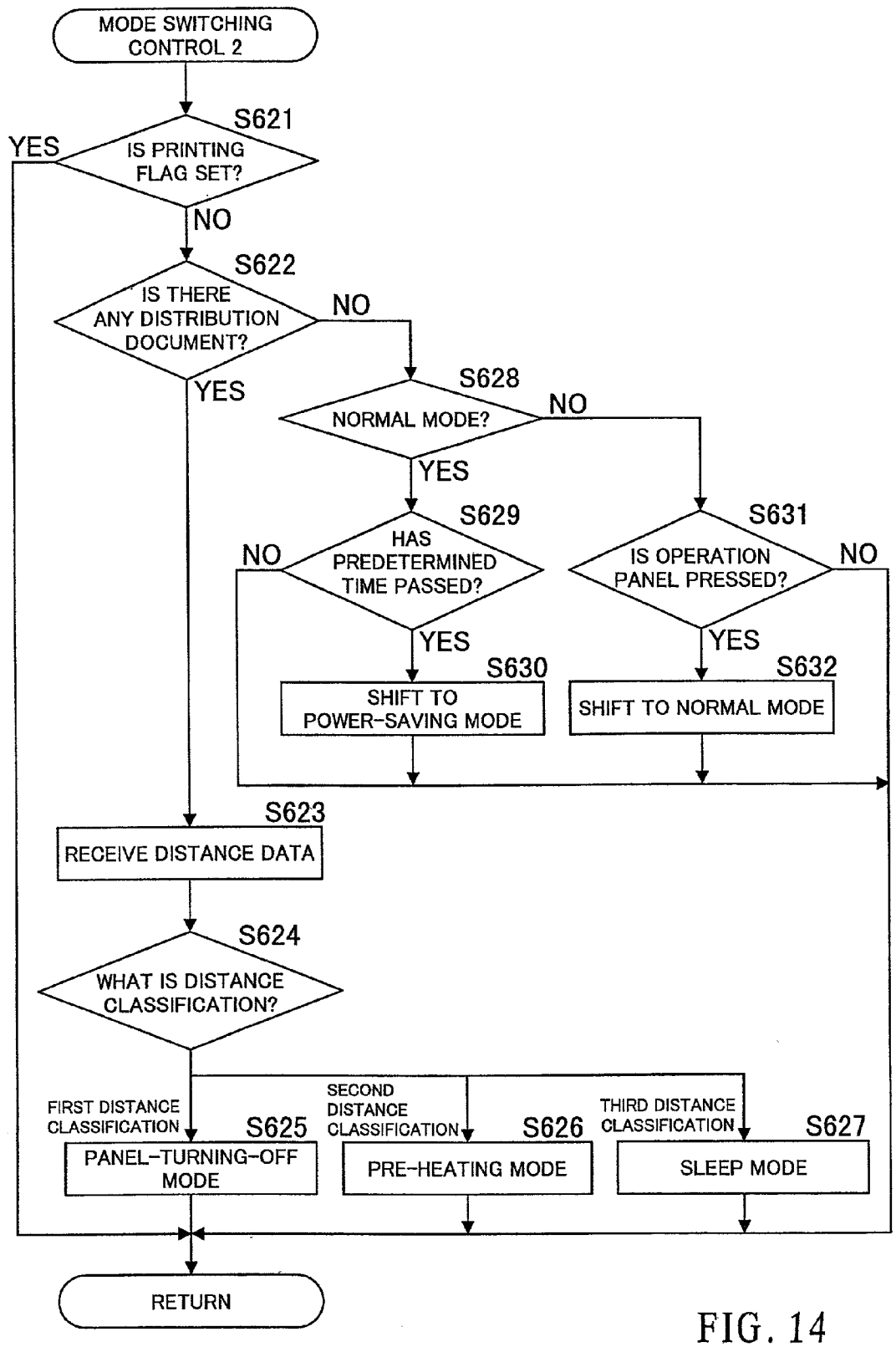
FIG. 14 is a flow chart showing a second example of the subroutine of the mode switching control processing shown in FIG. 9.

In details, in FIG. 14, the main control portion 124 judges whether the printing flag is set in S621. When the printing flag is not set (NO in S621), the routine proceeds to S622. When the printing flag is set (YES in S621), the routine returns.

In S622, it is judged whether there is any output-waiting distribution document. When there is an output-waiting distribution document (YES in S622), in S623, the main control portion 124 receives the distance data concerning the distance between the current position of the user carrying the portable terminal 210 which received that there is an output-waiting distribution document and the position of the image forming apparatus 100 from the control portion 203. In S624, the main control portion 124 discriminates the aforementioned distance classifications D1–D3, and processing is performed based on the discrimination.

When it is discriminated that the distance classification falls within the first distance classification D1, in S625, the panel-turning-off mode is selected. When it is discriminated that the distance classification falls within the second distance classification D2, in S626, the preheating mode is selected. When it is discriminated that the distance classification falls within the third distance classification D3, in S627, the sleep mode is maintained. Thereafter, the routine returns.

On the other hand, when there is no output-waiting distribution document (NO in S622), in S628, it is judged whether the image forming apparatus 100 is in the normal mode. When the current mode is the normal mode (YES in S628), in S629, the main control portion 124 judges whether the predetermined time has passed. When the predetermined time has passed (YES in S629), the current mode is switched to the power-saving mode in S630, and the routine returns.

This power-saving mode may be the sleep mode or more effective power-saving mode as compared with the sleep mode.

When the current mode is not the normal mode (NO in S628), it is Judged whether the operation panel 151 is pressed in S631. When the operation panel 151 is pressed (YES in S631), the current mode is switched to the normal mode in S632. When the operation panel 151 is not pressed (NO in S631), the routine returns.

In this case too, similarly to the example of FIG. 11, the user's waiting time can be decreased, resulting in optimal power-saving effect.

In this example, although the mode is switched among three distance classifications D1–D3, the present invention is not limited to this. The mode may be further subdivided, or the mode may be switched between two modes, a power-saving mode and a normal mode.

Furthermore, as for the power-saving mode, the present invention is not limited to the modes shown in FIGS. 11 and 14.

Next, the subroutine of the third example of the aforementioned mode switching control processing (S58 in FIG. 9) will be explained with reference to the flow chart shown in FIG. 15.

In this example, it is controlled such that the current mode is switched to a power-saving mode after a predetermined time has passed since the beginning of using the image forming apparatus 100. When the user carrying the portable terminal 210 which received the information that there is an output-waiting distribution document moves towards the image forming apparatus 100, the power-saving mode is cancelled.

Figure 15:
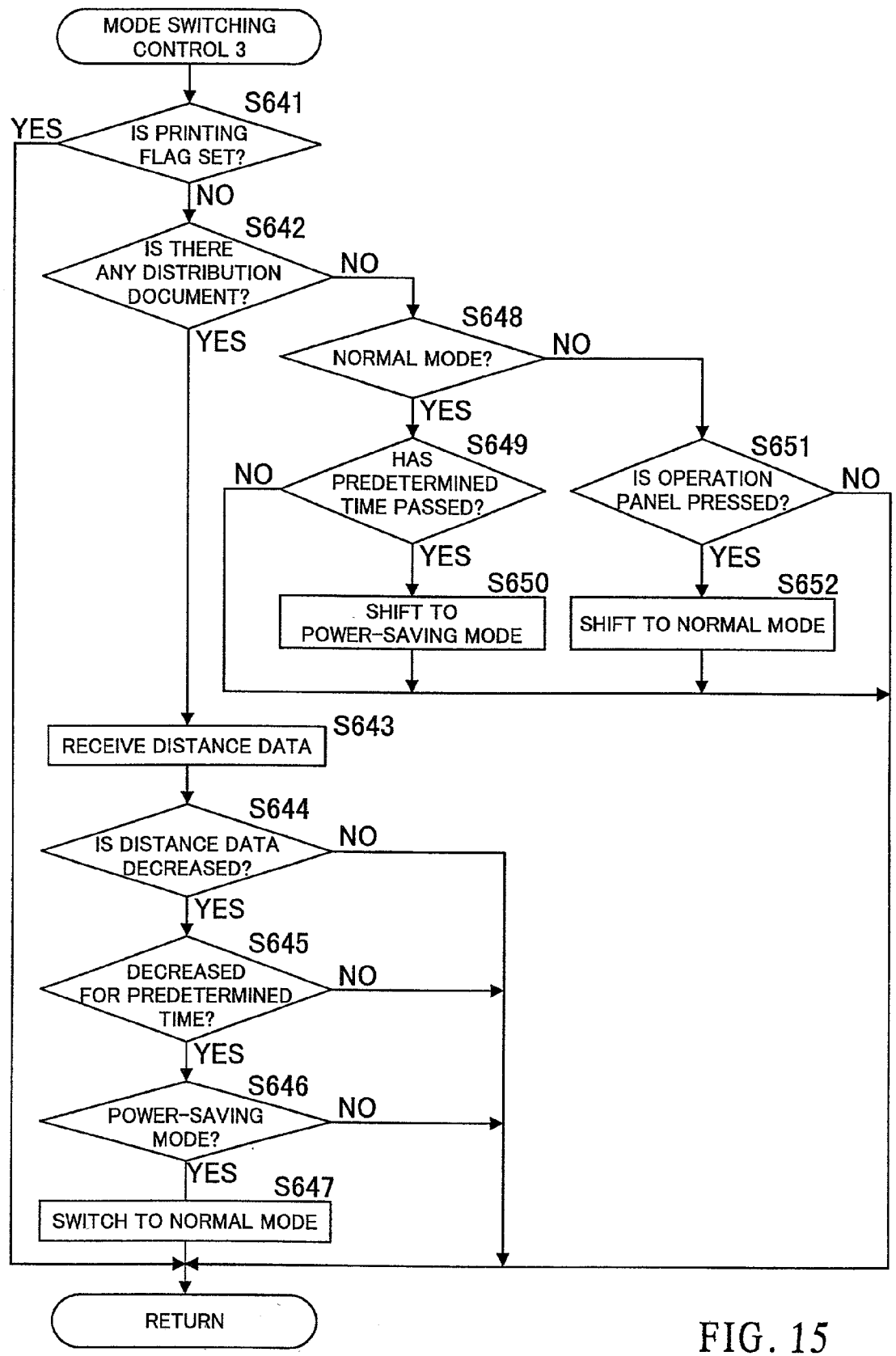
FIG. 15 is a flow chart showing a third example of the subroutine of the mode switching control processing shown in FIG. 9.

That is, in FIG. 15, the main control portion 124 judges whether-the printing flag is set in S641. When the printing flag is not set (NO in S641), the routine proceeds to S642. When the printing flag is set (YES in S641), the routine returns.

In S642, it is judged whether there is an output-waiting distribution document. When there is an output-waiting distribution document (YES in S642), in S643, the main control portion 124 receives the distance data concerning the distance between the current position of the user carrying the portable terminal 210 and the position of the image forming apparatus 100 from the control portion 203.

Subsequently, in S644, it is judged whether the distance data is decreasing (whether or not the portable terminal 210 is approaching the image forming apparatus 100). When the distance data is decreasing (YES in S644), it is judged whether the distance data decreasing has continued for a predetermined time in S645. When the distance data is not decreased (NO in S644) and the distance data has not been continuously decreased for a predetermined time (NO in S645), the routine returns.

When the distance data has been continuously decreased for a predetermined time (YES in S645), it is judged whether the current mode is the power-saving mode in S646. When the current mode is the power-saving mode (YES in S646), the current mode is switched to the normal mode in S647, and the routine returns. When the current mode is not the power-saving mode (NO in S646), the routine also returns.

On the other hand, when there is no output-waiting distribution document (NO in S642), in S648, it is judged whether an image forming apparatus 100 is in the normal mode. When the current mode is in the normal mode (YES in S648), the main control portion 124 judges whether the predetermined time has passed in S649. When the predetermined time has passed (YES in S649), the normal mode is switched to the power-saving mode in S650, and then the routine returns. When the current mode is not the normal mode (NO in S648), it is judged whether the operation-panel 151 is pressed in S651. When the operation panel 151 is pressed (YES in S651), the current mode is switched to the normal mode in S652. When the operation panel 151 is not pressed (NO in S652), the routine returns.

As will be understood from the aforementioned explanation, when the portable terminal 210 received the information that there is an output-waiting distribution document and the user carrying the portable terminal starts approaching the image forming apparatus with an intention of outputting the image, the aforementioned distance data decreases. Therefore, the power-saving mode is released and switched to the normal mode. Accordingly, the image forming apparatus 100 returns to the normal mode which is ready for forming an image when the user reaches the image forming apparatus 100. Thus, it becomes possible to attain power-saving and perform an image forming output operation without delay.

If the user carrying the portable terminal 210 has no intention of outputting an image, the user do not move. Therefore, the power-saving mode can be maintained and, for this reason, the effective power-saving effect can be obtained.

Furthermore, since it is judged whether the user has been continuously approaching the image forming apparatus for the predetermined time, even if the user moves with no intention of outputting the image, the power-saving mode will not be released by the user's simple movements.

Next, the subroutine of the fourth example of the aforementioned mode switching control processing (S58 in FIG. 9) will be explained with reference to the flow chart shown in FIG. 16.

By the way, if the image forming apparatus 100 is being warmed up, even if the user carrying the portable terminal 210 which received the information that there is an output-waiting distribution document approaches the image forming apparatus 100, since the warming up has not been completed, an immediate image forming output operation cannot be performed. In order to improve this state, the waiting time can be shortened by forbidding the pre-rotation of the fixing device 118 when the user approaches the image forming apparatus 100.

In the heat roller type fixing device 118 of the image forming apparatus, since the heater 32 is provided only at the upper fixing roller 31 and only the temperature of the fixing roller 31 is controlled, the temperature of the pressure roller 33 at the time of warming up is near the normal temperature.

On the other hand, since the recording paper receives heat not only from the fixing roller 31 but also from the lower pressure roller 32 in the fixing device 118 simultaneously, the fixing nature becomes better when the temperature of the pressure roller 33 is higher. Therefore, in the heat roller type fixing apparatus, since the temperature of the pressure roller 33 has not risen immediately after the warming-up, it is common that fixing nature is poor as compared with the stabilized state. In order to improve the poor fixing nature immediately after the warming-up, the fixing roller 31 and the pressure roller 33 are pre-rotated at the time of the warming-up.

However, in cases where the pre-rotation is performed at the time of warming-up, although the fixing nature immediately after the warming-up can be improved, the warming-up time becomes longer. That warming-up time becomes longer leads to the deterioration of operability. Therefore, the user who is going to perform the image formation output may feel very long even if the waiting time is a short time such as about 10 seconds.

Usually, in the image forming apparatus 100, a pre-rotation is performed so that a predetermined fixing state can be obtained with the severest fixing low temperature condition and/or paper which have been guaranteed in the model. In cases where the image data sent as electronic data via a network like in this embodiment is outputted, since recording papers supplied from a normal paper-feed cassette are usually normal papers, the fixing nature cannot be spoiled even if a pre-rotation is not performed, and it is not necessary to wait for the completion of the pre-rotation. FIG. 16 shows this case.

Figure 16:
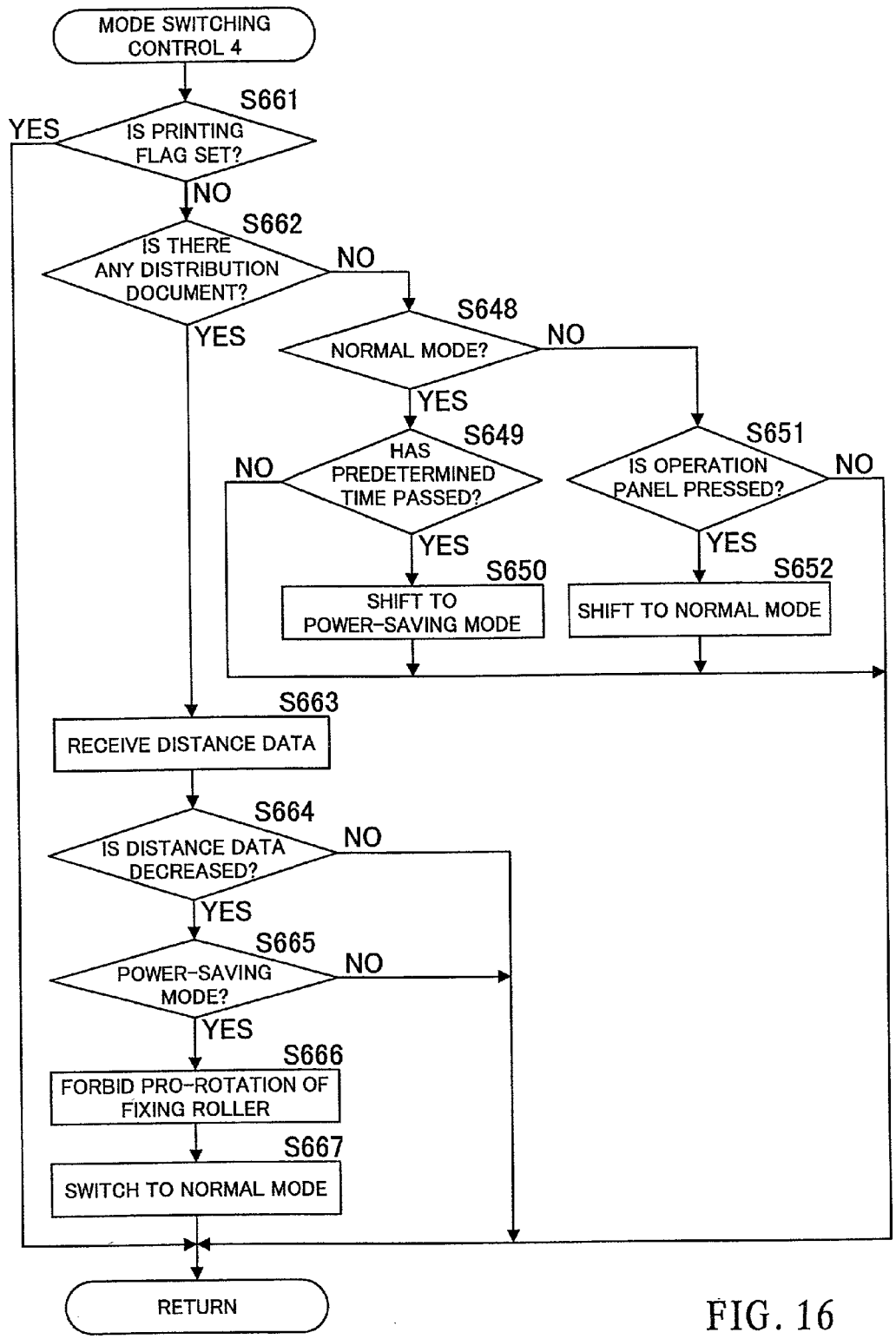
FIG. 16 is a flow chart showing a fourth example of the subroutine of the mode switching control processing shown in FIG. 9.

In FIG. 16, the main control portion 124 judges whether the printing flag is set in S661. When the printing flag is not set (NO in S661), the routine proceeds to S662. When the printing flag is set (YES in S661), the routine returns.

In S662, it is judged whether there is an output-waiting distribution document. When there is an output-waiting distribution document (YES in S662), in S663, the main control portion 124 receives the distance data concerning the distance between the current position of the user carrying the portable terminal 210 and the position of the image forming apparatus 100 from the control portion 203 in S663.

Subsequently, it is judged whether the distance data are decreasing (whether the portable terminal 210 is approaching the image forming apparatus 100) in S664. When the distance data are decreasing (YES in S664), it is judged whether the current mode is a power-saving mode in S665.

When the current mode is a power-saving mode (YES in S665), in S666, the pre-rotation of the fixing roller 31 is prohibited (Driving the motor 40 is prohibited). Thereafter, in S667, the current mode is switched to a normal mode, and then the routine returns. When the distance data is not decreasing (NO in S664) or when the current mode is not a power-saving mode (NO in S665), the routine returns.

Since the processing in cases where there is no distribution document (NO in S662) is the same as the processing of S648–S652 in FIG. 15, the explanation will be omitted by allotting the same step number to the corresponding step.

According to the example shown in FIG. 16, in order to perform an image formation output, the warming-up time is shortened, the operability is improved, and the user's waiting time can be shortened.

Figure 17:
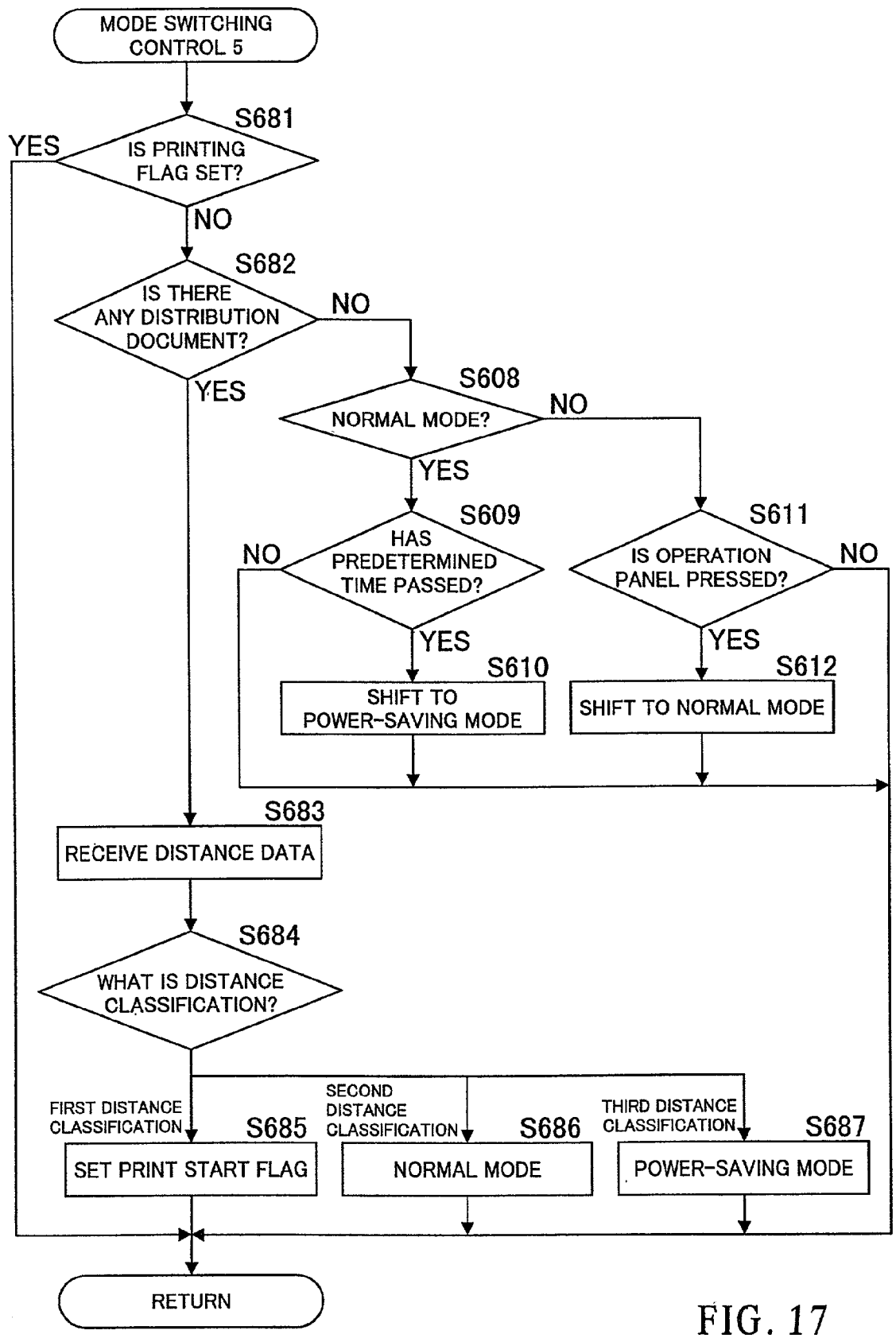
FIG. 17 is a flow chart showing a fifth example of the subroutine of the mode switching control processing shown in FIG. 9.

FIG. 17 is a flow chart showing the subroutine of the fifth example of the aforementioned mode switching control processing (FIG. 9 in S58).

In this example, the current mode automatically changes from the power-saving mode to the normal mode as the portable terminal 210 approaches the image forming apparatus 100. Furthermore, when the user approaches the first distance classification D1 of the image forming apparatus, the image forming apparatus starts printing automatically.

Concretely, in the mode switching control processing, when the user approaches the first distance classification D1 which is nearest to the image forming apparatus 100, the main control portion 124 sets a print start flag. When the user enters into the third distance classification D3 which is farthest from the image forming apparatus 100, the main control portion 124 controls so as to set to a power-saving mode. When the user enters into the second distance classification D2 which is a middle distance, the main control portion 124 sets to the normal mode.

That is, in FIG. 17, the main control portion 124 judges whether the printing flag is set in S681. When the printing flag is not set (NO in S681), the routine proceeds to S682. When the printing flag is set (YES in S681), the routine returns.

In S682, it is judged whether there is an output-waiting distribution document. When there is an output-waiting distribution document (YES in S682), in S683, the main control portion 124 receives the distance data concerning the distance between the current position of the user carrying the corresponding portable terminal 210 and the position of the image forming apparatus 100 from the control portion 203. In S684, the main control portion 124 discriminates the aforementioned distance classifications D1–D3, and mode switching processing of the image forming apparatus 100 is performed based on the discriminated result.

If it is the first distance classification D1, a print start flag is set in S685. When it is the second distance classification D2, the normal mode is set in S686. Furthermore, when it is the third distance classification D3, the power-saving mode is set in S687, and then the routine returns.

Therefore, as the user carrying the portable terminal 210 approaches the image forming apparatus 100, the current mode changes from the power-saving mode to the normal mode, and as the user further approaches the image forming apparatus 100, the image forming apparatus starts printing automatically.

In cases where there is no distribution document (NO in S682), the explanation will be omitted by allotting the same step number to the corresponding step since the processing is the same as the processing in S608–S612 in FIG. 11.

Figure 18:
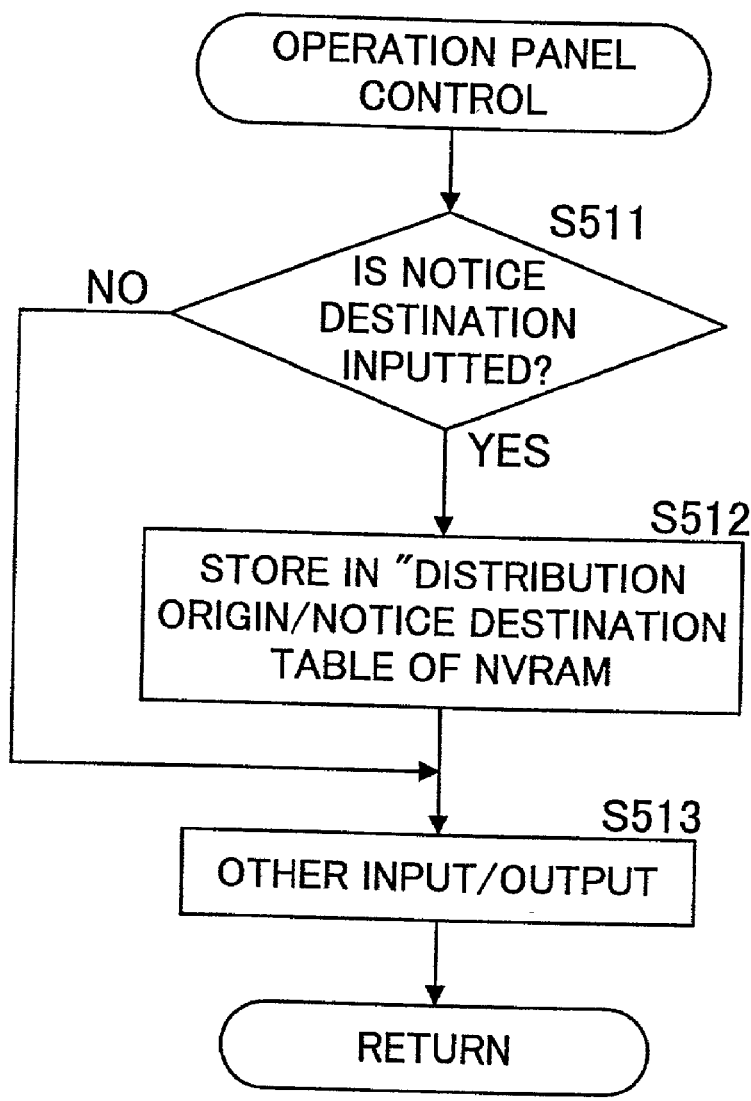
FIG. 18 is a flow chart showing a second example of the subroutine of the operation panel control shown in FIG. 9.

In this fifth example of the mode switching control, since the print automatically starts without displaying the output direction operation of the operation panel 151, the routine of the operation panel control processing in S57 in the main routine of the image forming apparatus 100 is shown in FIG. 18.

That is, in FIG. 18, the main control portion 124 judges first whether the notice destination ID of the portable terminal 210 is inputted into the operation panel 151 by the user in S511. When the notice destination ID of the portable terminal 210 is inputted (YES in S511), in S512, the notice destination ID of the portable terminal 210 is stored in the NVRAM 1243. Subsequently, other input/output control processing is performed in S513, and then the routine returns. When the notice destination ID of the portable terminal is not inputted (NO in S511), the routine proceeds to S513.

Figure 19:
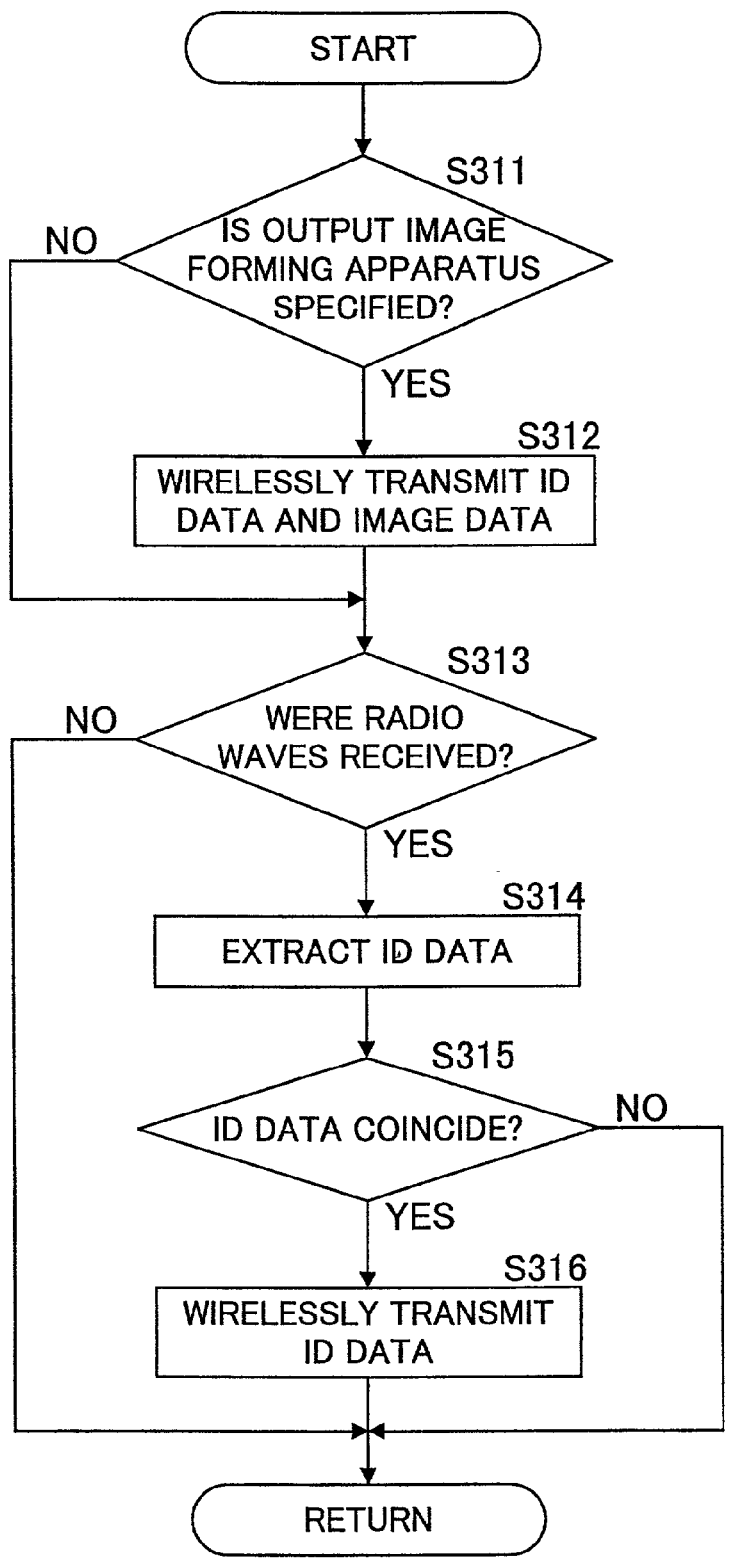
FIG. 19 is a flow chart showing an operation of a portable terminal according to another embodiment.
Figure 20:
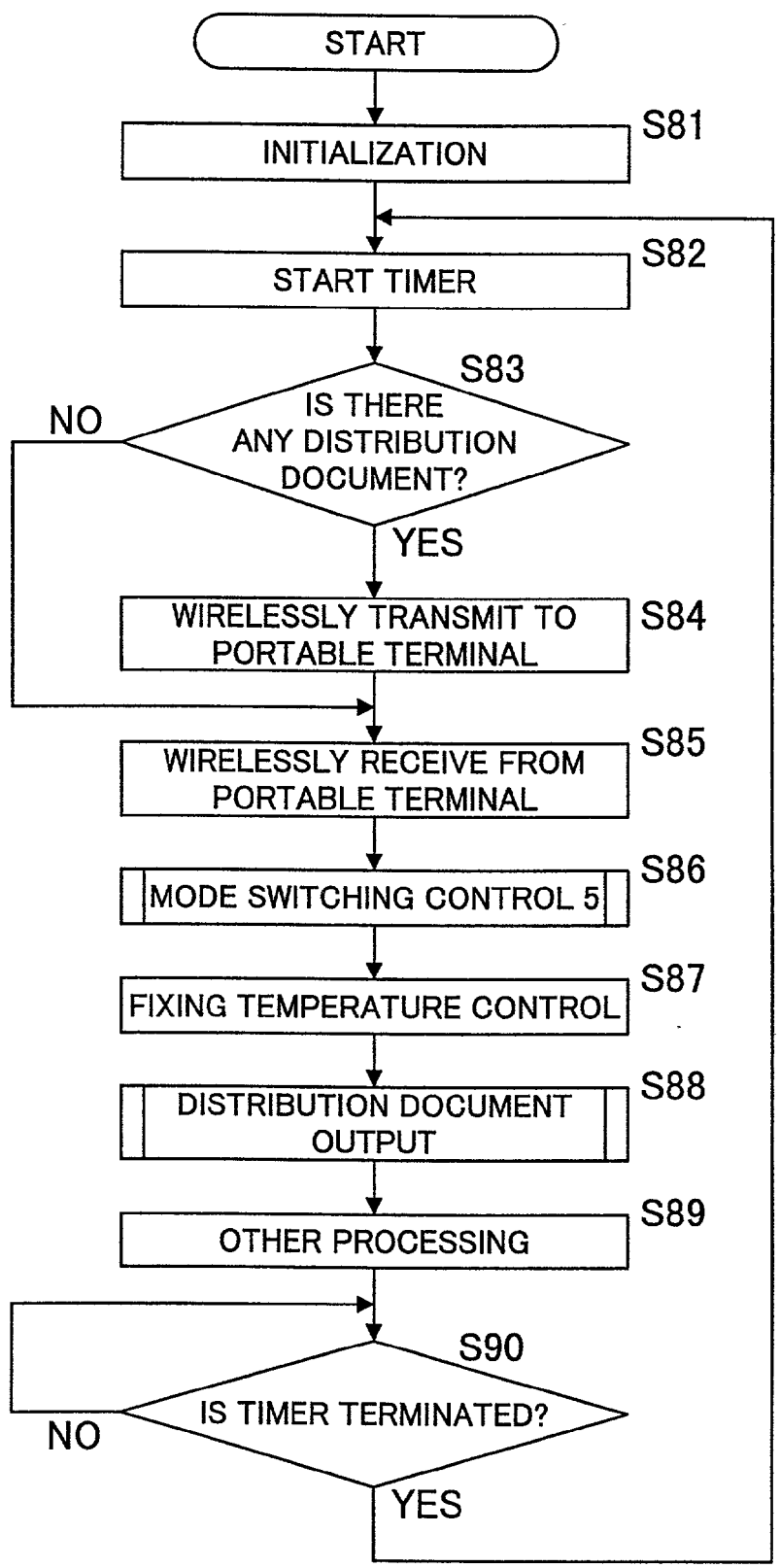
FIG. 20 is a flow chart showing an operation of an image forming apparatus according to another embodiment.

FIG. 19 is a flow chart showing the operation of another embodiment of the portable terminal 210. FIG. 20 is a flow chart showing the operation of another embodiment of the image forming apparatus 100 corresponding to the above.

Here, a distribution document (image data) is sent to the image forming apparatus 100 from the portable terminal 210, the position is asked to the portable terminal 210 which sent the distribution document (image data).

In the portable terminal 210, in FIG. 19, the wireless transmitting portion 211 first judges whether there is a designation of the image forming apparatus 100 in S311. When there is a designation of the image forming apparatus 100 (YES in S311), in S312, the self-ID data and the distribution document (image data) are sent to the image forming apparatus 100. When there is no designation of the image forming apparatus 100 (NO in S311), the routine proceeds to S313.

In S313, it is judged whether the wireless receiving portion 212 received the radio waves from the communicating portion 200 of the image forming apparatus 100. When the radio waves were received (YES in S313), the received radio waves are demodulated, and the communication data is taken out from the demodulated signal and sent to the control portion 213. When no radio waves were received (NO in S313), the routine returns.

In S314, the control portion 213 extracts the notice destination ID and the notice origin ID from the communication data sent from the wireless receiving portion 212.

In S315, the control portion 213 compares the extracted notice destination ID with the self-ID previously registered in the NVRAM 2133. When both IDs coincide (YES in S315), the notice origin ID is sent to the display portion 215. Simultaneously, the communication data containing the self-ID and the notice origin ID are sent to the wireless transmitting portion 211 as reply-information replying to the image forming apparatus 100. When both IDs do not coincide (NO in S315), the routine returns.

In S316, the wireless transmitting portion 211 superposes the communication data from the control portion 213 on modulating signals by a predetermined method, such as FM modulation method or PCM modulation method, and transmits to the image forming apparatus 100 as radio waves, and then the routine return.

In FIG. 20, on the other hand, in the image forming apparatus 1.00, the control portion 124 performs initialization of each portion in S81, and then makes an internal timer start in S82.

In S83, it is judged whether there is any distribution document (image data) from the portable terminal 210. When there is a distribution document (YES in S83), in S84, the notice origin ID and the notice destination ID which are the information that there is an output-waiting distribution document are transmitted to the corresponding portable terminal 210 via the wireless transmitting portion 201. When there is no distribution document (NO in S83), the routine proceeds to S85.

In S85, when the notice origin ID and the notice destination ID, which are a reply-information from the portable terminal 210 replying to the sending information that there is an output-waiting distribution document, are received by the wireless receiving portion 202, in S86, the fifth mode switching control (FIG. 17) concerning power consumption is performed.

In S87, the temperature of the fixing device 118 is controlled based on the mode switching control processing in S56.

In S88, the distribution document is outputted, and thereafter another processing is performed in S89.

In S90, it is judged whether the aforementioned timer is terminated, and when the aforementioned timer is terminated (YES in S90), the routine returns to S82. When the aforementioned timer is not terminated (NO in S90), the judgment processing will be repeated until the timer is terminated.

By employing such a structure, it becomes possible to send the data from the portable terminal 210, to switch the power mode as the user approaches the image forming apparatus 100, and to print the data when the user approaches to a predetermined distance.

Figure 21:
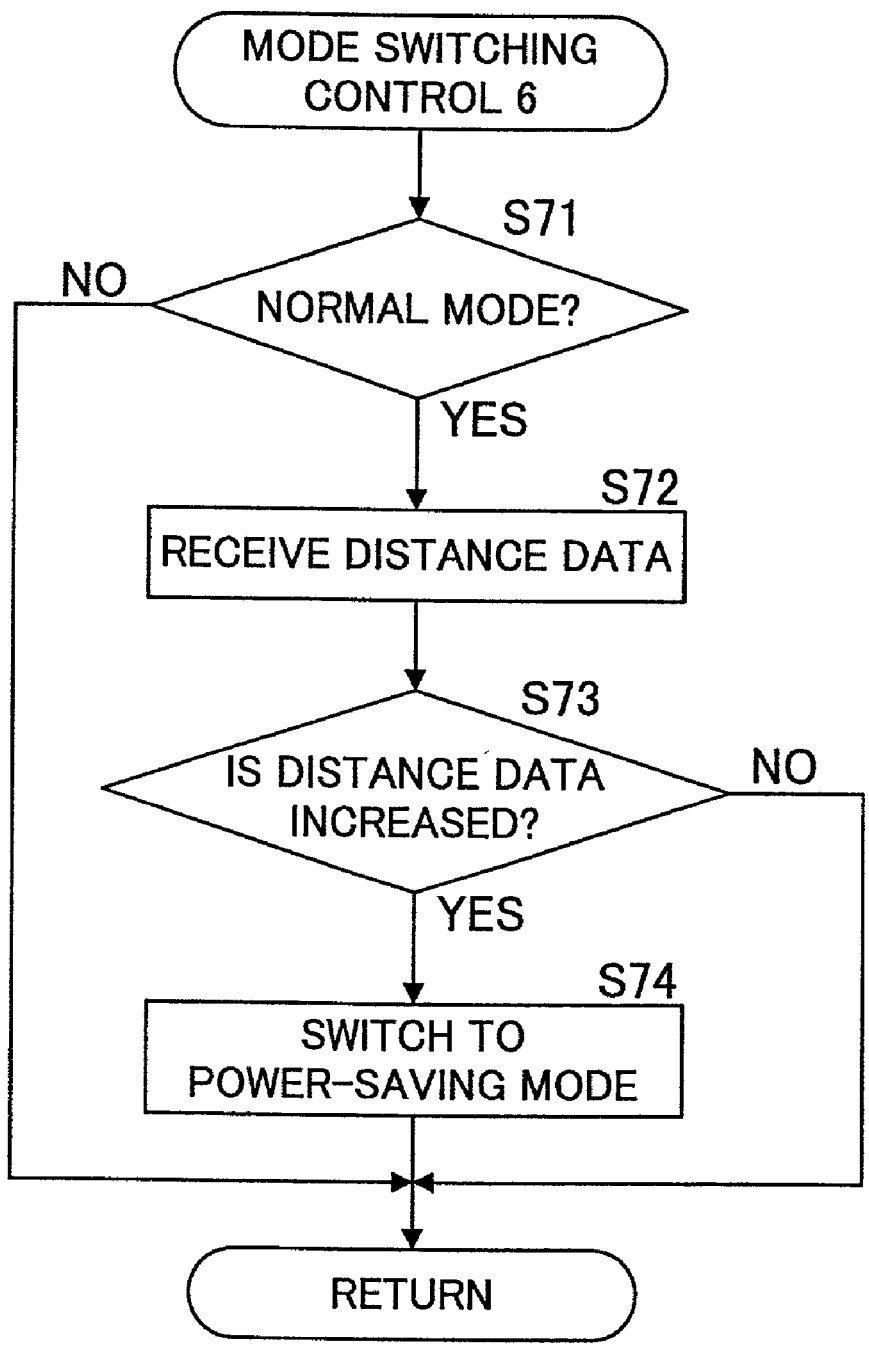
FIG. 21 is a flow chart showing a sixth example of a subroutine of a mode switching control processing.

FIG. 21 is a flow chart showing the subroutine of the sixth mode switching control processing concerning the power consumption. This subroutine is processing performed after the distribution document output processing (S60, S88) shown in FIGS. 9 and 20.

Here, after the image forming apparatus 100 outputs an output-waiting distribution document, the mode of the image forming apparatus 100 is switched to the power-saving mode to save power depending on the position of the portable terminal 210.

Generally, the shifting to the power-saving mode will be performed after the predetermined time after the termination of the image forming. However, in cases where the mode is shifted to the power-saving mode after the predetermined time, even if the image forming apparatus is not used for a while after the document output, the normal mode will be maintained for a predetermined time. Accordingly, the power-saving effect will be decreased.

In order to improve this, in cases where the output-waiting distribution document of the user carrying the portable terminal 210 which received the information that there is an output-waiting distribution document is outputted and the user goes away from the image forming apparatus 100, it controls to shift to the power-saving mode immediately.

In FIG. 21, the main control portion 124 first judges whether it is in the normal mode in S71. When it is in the normal mode (YES in S71), the routine proceeds to S72. When it is not in the normal mode (NO in S71), the routine returns.

In S72, the main control portion 124 receives the distance data of the portable terminal 210 from the control portion 203, and in S73, it is judged whether the distance data is increased (whether the user carrying the portable terminal is going away from the image forming apparatus 100).

When the distance data is increased (YES in S73), in S74, the mode is shifted to the power-saving mode, and then the routine returns. When the distance data is not increasing (NO in S73), it is judged that the user is still there, and the routine returns to keep the normal mode.

The aforementioned control can suppress wasteful power consumption in the normal mode in which there is no use-schedule after the output of the distribution document for a while, resulting in power-saving. Furthermore, in cases where the user who outputted the output-waiting distribution document intends to output another distribution document continuously, since there is no fluctuation of the distance data, there is no fear that the mode will shift to the power-saving mode unintentionally. Accordingly, the user can output image without waiting.

In addition, in the embodiment shown in FIG. 21, the mode switching from the normal mode to the power-saving mode may be performed from the normal mode to the sleep mode, then from the sleep mode to the pre-heating mode and then the pre-heating mode to the panel-turning-off mode, etc.

The terms and descriptions in this specification are used only for explanatory purposes and the present invention is not limited to these terms and descriptions. It should be appreciated that there are many modifications and substitutions without departing from the spirit and the scope of the present invention which is defined by the appended claims. A present invention permits any design-change, unless it deviates from the soul, if it is within the limits by which the claim was performed.

What is claimed is:

1. An image forming system, comprising:
    an image forming apparatus with a plurality of modes concerning power consumption, said image forming apparatus being capable of wirelessly transmitting information that there is a waiting job;
    a portable terminal which is capable of receiving said information transmitted wirelessly from said image forming apparatus;

a position detector which detects a position of said portable terminal; and a mode switcher which switches from one mode concerning power consumption of said image forming apparatus to another in accordance with said position of said portable terminal which received said information.

2. An image forming apparatus, comprising:

a transmitter which is capable of wirelessly transmitting job-existence-information that there is an output-waiting-job to a portable terminal;

a receiver which receives reply-information replying to said job-existence-information transmitted wirelessly from said portable terminal;

a position detector which detects a position of said portable terminal whose reply-information is received by said receiver; and a mode switcher which switches from one mode concerning power consumption to another based on said position of said portable terminal detected by said position detector.

3. The image forming apparatus as recited in claim 2, further comprising a discriminator which discriminates whether or not said portable terminal is approaching said image forming apparatus based on a detection result by said position detector, wherein said mode switcher switches from one mode concerning power consumption to another when said discriminator discriminated that said portable terminal is approaching said image forming apparatus.

4. The Image forming apparatus as recited in claim 2, wherein said mode switcher forbids a pre-rotation of a fixing device when said mode is being switched.

5. The Image forming apparatus as recited in claim 2, wherein said mode switcher switches from one mode concerning power consumption from another only when it has been continuously discriminated for a predetermined time that said portable terminal is approaching said image forming apparatus.

6. The Image forming apparatus as recited in claim 2, further comprising a discriminator which discriminates whether or not said portable terminal is going away from said image forming apparatus based on a detection result by said position detector, wherein said mode switcher switches from one mode concerning power consumption to another when said output-waiting-job is outputted by said image forming apparatus and it is discriminated that said portable terminal is going away from said discriminator.

7. An image forming apparatus, comprising:

a printer which prints a print job on a paper;

a communication device which communicates wirelessly with a prescribed portable terminal when there is a print job waiting for being printed by said printer;

a position detector which detects a position of said portable terminal based on a communication result of said communication device; and a mode selector which selects one mode from a plurality of modes concerning power consumption of said printer based on said position of said portable terminal detected by said position detector.

8. The image forming apparatus as recited in claim 7, further comprising a discriminator which discriminates whether or not said portable terminal is approaching said image forming apparatus based on a detection result by said position detector, wherein said mode selector selects a corresponding mode when said discriminator discriminates that said portable terminal is approaching said image forming apparatus.

9. The image forming apparatus as recited in claim 7, further comprising a discriminator which discriminates whether or not said portable terminal is going away from said image forming apparatus based on a detection result by said position detector, wherein said mode selector selects a corresponding mode when said discriminator discriminates that said portable terminal is going away from said image forming apparatus after a completion of printing by said printer.

10. The image forming apparatus as recited in claim 7, wherein said plurality of modes include a normal mode in which said printer executes a print job and a power-saving mode in which said printer does not executes a printing job.

11. The image forming apparatus as recited in claim 7, wherein said printer includes a fixing device for fixing an image on a paper with heat, and wherein said plurality of modes differ in control temperature of said fixing device from each other.

12. The image forming apparatus as recited in claim 11, wherein said fixing device includes a fixing member containing a heating source, a pressure member with no heating source which pinches a fixing paper in cooperation with a fixing member, a driving source which drives to rotate said fixing member and said pressure member and a driving controller which starts to operate said driving source when said mode is switched, and wherein an operation of said driving controller is forbidden when said discriminator discriminates that said portable terminal is approaching said image forming apparatus.

13. The image forming apparatus as recited in claim 8, wherein said mode selector selects a corresponding mode only when it has been continuously discriminated for a predetermined time that said portable terminal is approaching said image forming apparatus.

14. The image forming apparatus as recited in claim 7, wherein said printer executes a print job received from an external device.

15. The image forming apparatus as recited in claim 14, further comprising a terminal selector which selects a portable terminal according to said external device, wherein said communication device communicates with said portable terminal selected by said terminal selector.

16. The image forming apparatus as recited in claim 7, wherein said printer executes a print job received from said portable terminal.

17. An image forming apparatus, comprising:

a job-output device which outputs a job;

a communication device which communicates wirelessly with a prescribed portable terminal when there is an output-waiting-job waiting to be outputted from said job-output device;

a position detector which detects a position of said portable terminal based on a communication result of said communication device; and a controller which controls said image forming apparatus based on said position of said portable terminal detected by said position detector.

18. The image forming apparatus as recited in claim 17, wherein said controller controls a start of an output by said job-output device.

19. The image forming apparatus as recited in claim 17, wherein said controller controls said start of an output by said job-output device when a distance from said image forming apparatus to said portable terminal is within a predetermined distance.

20. The image forming apparatus as recited in claim 17, wherein said controller switches from one mode concerning power consumption of said image forming apparatus to another.

21. The image forming apparatus as recited in claim 17, wherein said controller switches between a normal mode in which said job-output device is capable of executing output processing and a power-saving mode in which said job-output device do not execute said output processing.

22. The image forming apparatus as recited in claim 17, wherein said job-output device outputs a job received from an external device.

23. The image forming apparatus as recited in claim 22, further comprising a terminal selector which selects a portable terminal according to said external device, wherein said communication device communicates with said portable terminal selected by said terminal selector.

24. The image forming apparatus as recited in claim 17, wherein said job-output device outputs a job received from said portable terminal.

25. An image forming apparatus, comprising:
 a printing device which prints a print job on a paper;
 a communication device which communicates wirelessly with a prescribed portable terminal when there is a print job waiting for being printed by said printing device;
 a position detecting device which detects a position of said portable terminal based on a communication result of said communication device; and
 a controller which selects one mode from a plurality of modes concerning power consumption of said printing device based on said position of said portable terminal detected by said position detecting device.

26. An image forming apparatus comprising:
 an output device which outputs a job;
 a communication device which communicates wirelessly with a prescribed portable terminal when there is an output-waiting-job waiting for being outputted from said output device;
 a position detection device which detects a position of said portable terminal based on a communication result of said communication device; and
 a controller which controls said image forming apparatus based on said position of said portable terminal detected by said position detection device.

27. An image forming system comprising an image forming apparatus having at least one part that consumes electric power in operation, the image forming system comprising:
 a wireless communication unit capable of wirelessly communicating with a portable terminal;
 a determining unit for determining if the portable terminal is known in accordance with information obtained from the wireless communication unit;
 a position detector for detecting a position of the portable terminal in accordance with a communication result of the wireless communication unit; and
 a control unit for controlling an operation of the at least one part of the image forming apparatus if it is determined by the determining unit that the portable terminal is known.

28. The image forming system of claim 27, wherein the determining unit compares an ID of the portable terminal contained in the information obtained by the wireless communication unit and an ID of the portable terminal stored in the image forming apparatus.

29. The image forming system of claim 27, wherein the at least one part includes a fixing device for thermally fixing toner image onto a recording medium, and wherein the control unit controlling a temperature of the fixing device.

30. An image forming system comprising an image forming apparatus having at least one part that requires a time to return to a normal mode from a power saving mode, the image forming system comprising:
 a wireless communication unit capable of wirelessly communicating with a portable terminal;
 a determining unit for determining if the portable terminal is known in accordance with information obtained from the wireless communication unit; and
 a control unit for controlling the at least one part of the image forming apparatus to return the normal mode from the power saving mode if it is determined by the determining unit that the portable terminal is known.

31. The image forming system of claim 30, wherein the at least one part includes a fixing device for thermally fixing toner image onto a recording medium, and wherein the control unit controlling a temperature of the fixing device.

32. The image forming system of claim 30, wherein the determining unit compares an ID of the portable terminal contained in the information obtained by the wireless communication unit and an ID of the portable terminal stored in the image forming apparatus.

* * * * *